(12) United States Patent
Zhang et al.

(10) Patent No.: US 10,785,744 B1
(45) Date of Patent: Sep. 22, 2020

(54) OFFLOADING LOCATION COMPUTATION FROM CLOUD TO ACCESS POINT (AP) WITH PROJECTION ON BASE PHASE VECTORS

(71) Applicant: Cisco Technology, Inc., San Jose, CA (US)

(72) Inventors: Xu Zhang, Santa Clara, CA (US); Paul J. Stager, Akron, OH (US); Santosh Ghanshyam Pandey, Fremont, CA (US); Matthew Aaron Silverman, Shaker Heights, OH (US); Abhishek Mukherji, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/380,705

(22) Filed: Apr. 10, 2019

(51) Int. Cl.
| H04W 74/00 | (2009.01) |
| H04W 64/00 | (2009.01) |
| H04W 8/02 | (2009.01) |
| H04W 4/33 | (2018.01) |
| H04B 17/382 | (2015.01) |
| H04W 4/02 | (2018.01) |
| H04B 17/327 | (2015.01) |

(52) U.S. Cl.
CPC ........ *H04W 64/006* (2013.01); *H04B 17/327* (2015.01); *H04B 17/382* (2015.01); *H04W 4/023* (2013.01); *H04W 4/33* (2018.02); *H04W 8/02* (2013.01)

(58) Field of Classification Search
CPC .. H04B 7/0478; H04B 7/0428; H04B 7/0456; H04B 7/0469; H04B 7/0426; H04L 5/23; H04W 74/00; H04W 74/0866

USPC .............. 455/452.1, 456.2; 370/252, 328; 375/267, 343
See application file for complete search history.

(56) References Cited

U.S. PATENT DOCUMENTS

| 5,928,311 | A  | * | 7/1999  | Leavy      | H03H 17/02  |
|           |    |   |         |            | 381/97      |
| 6,954,721 | B2 | * | 10/2005 | Webber     | G06F 17/15  |
|           |    |   |         |            | 375/343     |
| 7,801,238 | B2 | * | 9/2010  | Borst      | H04B 7/0426 |
|           |    |   |         |            | 375/267     |
| 8,917,623 | B2 | * | 12/2014 | Peng       | G01S 5/0215 |
|           |    |   |         |            | 370/252     |
| 9,247,381 | B2 | * | 1/2016  | Venkatraman | H04W 24/08 |
| 9,532,261 | B2 |   | 12/2016 | Raleigh et al. | |
| 9,654,195 | B2 | * | 5/2017  | Rahman     | H04B 7/0478 |
| 9,787,379 | B2 | * | 10/2017 | Onggosanusi | H04B 7/0456 |

(Continued)

*Primary Examiner* — William D Cumming
(74) *Attorney, Agent, or Firm* — Merchant & Gould P.C.

(57) ABSTRACT

Offloading of location computation from a location server to an access point through the use of projections on base phase vectors may be provided. First, an Access Point (AP) may receive a set of two or more base phase vectors from a location server. Next, the AP may measure a measured phase vector for a first signal from a user device. Then, the AP can determine projection values based on a comparison of the measured phase vector to each base phase vector. From these comparisons, the AP can determine a subset of base phase vectors with the highest projection values. The AP can then send the projection values and the subset of base phase vectors to the location server, wherein the location server determines the device location from these projection values and subset of base phase vectors.

13 Claims, 15 Drawing Sheets

(56) References Cited

U.S. PATENT DOCUMENTS

| | | | |
|---|---|---|---|
| 9,820,105 B2 | 11/2017 | Snyder et al. | |
| 9,893,777 B2* | 2/2018 | Onggosanusi | H04B 7/0456 |
| 9,955,359 B2 | 4/2018 | Monaghan et al. | |
| 10,063,299 B2* | 8/2018 | Liu | H04L 5/0026 |
| 10,469,143 B2* | 11/2019 | Liu | H04B 7/0478 |
| 2003/0055610 A1* | 3/2003 | Webber | G06F 17/15 |
| | | | 702/194 |
| 2008/0242309 A1* | 10/2008 | Borst | H04B 7/0697 |
| | | | 455/452.1 |
| 2010/0150056 A1* | 6/2010 | Iwai | H04W 74/0866 |
| | | | 370/328 |
| 2013/0053056 A1 | 2/2013 | Aggarwal et al. | |
| 2013/0294265 A1* | 11/2013 | Peng | G01S 5/0289 |
| | | | 370/252 |
| 2014/0011518 A1 | 1/2014 | Valaee et al. | |
| 2015/0271632 A1* | 9/2015 | Venkatraman | G01S 5/02 |
| | | | 455/456.2 |
| 2016/0142115 A1* | 5/2016 | Onggosanusi | H04B 7/065 |
| | | | 370/252 |
| 2016/0142117 A1* | 5/2016 | Rahman | H04B 7/0469 |
| | | | 375/267 |
| 2016/0156397 A1* | 6/2016 | Onggosanusi | H04L 5/005 |
| | | | 370/252 |
| 2016/0323025 A1* | 11/2016 | Liu | H04B 7/0658 |
| 2018/0351617 A1* | 12/2018 | Liu | H04B 7/0658 |
| 2019/0044756 A1* | 2/2019 | Zhao | H04L 5/0048 |
| 2020/0044703 A1* | 2/2020 | Liu | H04B 7/0417 |

* cited by examiner

OFFLOADING LOCATION COMPUTATION FROM CLOUD TO ACCESS POINT (AP) WITH PROJECTION ON BASE PHASE VECTORS

TECHNICAL FIELD

The present disclosure relates generally to location services in a computer network.

BACKGROUND

A computer network or data network can interface with devices that access the network to receive various services. Some of the services require location information about the device. For example, some of these services may include advertising goods or services located near the device, providing information about another object (e.g., a painting or sculpture in a museum, a location on a battlefield, etc.) near the device, etc. Generally, the location computations are concentrated on a central server in communication with the Access Points (APs) that interface with the devices.

One method for determining location of a device is for a Time Of Arrival (TOA) antenna information associated with a device to be sent to a central server. Then, several different sets of antenna information, from several APs, can be combined to locate (for example, through triangulation) the device. Current location (also referred to as hyperlocation) requires a group of APs to each measure an AoA (Angle-of-Arrival) phase vector for a specific client and send all these AoA phase vectors to a central location server or cloud location server. For each AP, an AoA heat map is then computed based on the measured AoA phase vectors. Finally, all heat maps of the grouped APs are combined to locate the client.

Hyperlocation does not scale well because the above correlation computation needs to be conducted for each AP and each client, and for each grid point on a map (or within certain smaller areas). Thus, the location server is attempting to make repeatedly all these computations for numerous APs, devices, networks, grids, which becomes burdensome or too intensive for the processor of the location server.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
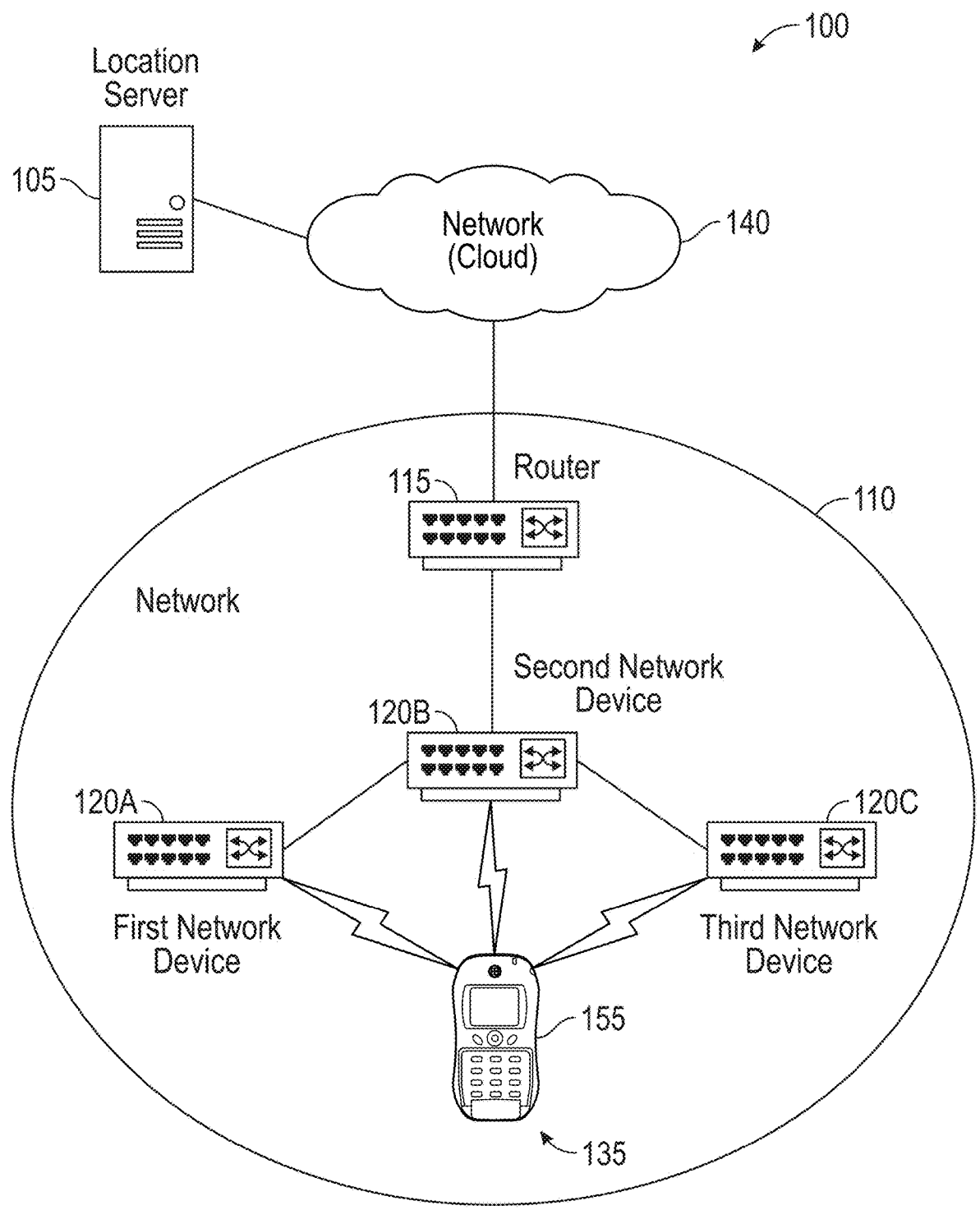
FIG. 1 shows an operating environment for determining a location of a device in a location where at least part of the determination is made at an AP in accordance with aspects of the present disclosure.

Offloading of location computation from a location server to an access point through the use of projections on base phase vectors may be provided. First, an Access Point (AP) may receive a set of two or more base phase vectors from a location server. Next, the AP may measure a measured phase vector for a first signal from a user device. Then, the AP can determine projection values based on a comparison of the measured phase vector to each base phase vector. From these comparisons, the AP can determine a subset of base phase vectors with the highest projection values. The AP can then send the projection values and the subset of base phase vectors to the location server, wherein the location server determines the device location from these projection values and subset of base phase vectors.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

As a first step in computing a device's location at the edge, an AP can determine which floor the device belongs to and then can estimate the X, Y position of the device on the floor. In an enterprise occupying a multi floor building, it can be difficult to come up with a stand-alone distributed algorithm to determine which floor the device belongs to and hence which APs to consider while computing the location at the edge. This problem is particularly hard due to the different deployments, floor heights, density of APs per floor that are observed in practical deployments. Assuming the client's floor to be the same floor as the AP can lead to further problems as the assumption may be incorrect.

The proposed solution to this issue is mainly centered around dynamically determining a RSSI threshold that the associated AP can use to assume that the device is on the same floor as the AP. The threshold not only may depend on the type of floor or building and density of APs, as indicated above, but also on the area on the floor that the AP is located and serving. The 2 APs we would consider are the red and blue APs on the 2nd floor. As seen from the figure the red AP is close to an atrium (i.e. an opening in the floor to view the floor An optimal RSSI threshold can minimize incorrect floor determination and can be obtained by simple classification techniques like logistic regression or just maximum likelihood. The existing floor determination algorithm can be run in the cloud. Although the result may be different than the actual floor of the device, the determination is relatively robust and has high degree of accuracy. Moreover, this determination is the best feedback other than getting feedback from the users, which is manual process and hard to obtain.

In general, the solution can learn or determine an RSSI threshold on the cloud during an initial start-up phase and push these predetermined RSSI thresholds back to the edge on each AP. Thus, in the initial start-up stage, all APs can send all RSSIs to the cloud, which computes the X, Y location from the raw RSSIs. The cloud can then estimate and push the per-AP RSSI threshold to the APs. In at least some configurations, the optimization for the RSSI threshold criteria could be to minimize the type 2 errors or maximize accuracy.

Then, the AP can user the RSSI threshold to determine if the AP can determine the floor on which the device is located and then compute the X,Y location of the device on the floor. Evaluation of the threshold can be: if the associated client RSSI is greater than the RSSI threshold, then the AP computes the location and sends the computed X, Y location to cloud. IN contrast, if the associated client RSSI is less than the RSSI threshold, then the AP can send the raw AP RSSIs and locations to the cloud for floor determination and an X, Y compute. The APs know which floor they belong to and the other APs on the floor they are associated therewith because cloud can notify the APs during the startup. RSSI of clients associated to APs on the other floors are sent directly to cloud, while the RSSI of the client associated to APs on its own floor can be sent to the associated AP.

Then, the cloud can store the computed X, Y and/or the raw RSSI and computes the X, Y for the client. The solution may also auto detect any changes to the threshold that may occur over time. Thus, the cloud can periodically run the classification algorithm to determine if the optimal threshold needs to be changed on the AP based on the RSSIs reported directly to cloud. For example if the raw RSSIs reported mostly result in the same floor as the associated AP then Cloud could potentially decrease the RSSI threshold. Thus, a gradual descent-type search for these optimal thresholds could be initiated iteratively.

Only once the device signal RSSI is greater than the RSSI threshold may the AP determine location information. The AP can perform at least some of the location calculations, which would push the location computation to the edge without compromising the reliability and robustness of the existing solution. More specifically, using AP4800 as an example, there are 16 antennas on each AP. So each phase vector for location determination is a 1-by-16 complex vector. Each AoA heat map is computed by correlating the measured phase vector with ideal phase vectors of all grid points on the map. A higher correlation value indicates that the user device is more likely to be on the corresponding grid point (or the signal is received from the corresponding azimuth angle). After adding together all the heat maps of all grouped APs, the grid point with the largest correlation value is chosen as the client location.

A main reason that hyperlocation is computationally intensive is because the above correlation computation of phase vectors needs to be conducted for each AP and each client, and for each grid point on the map (or within certain smaller areas). When the AP has n antennas, each phase vector correlation computation takes n complex multiplications and n complex additions. In order to improve scalability of hyperlocation in cloud, embodiments herein construct a set of orthogonal base phase vectors and pre-compute the base AoA heat map for each of them.

During location, each AP can project the measured phase vector onto the set of base phase vectors and only reports the top m projections to the cloud. Based on the projections, the cloud weighted-sums the precomputed base AoA heat maps for location computation. This process reduces the computational complexity at the cloud to m/n of its current value, with n being the number of antennas at AP.

To improve the scalability of hyperlocation, the embodiments herein propose the following method (by using an AP with 16 antennae): because each phase vector is a 1-by-16 complex vector, it is always within a 16-dimensional space. Therefore, if the cloud can compute a set of 16 bases for this 16-dimensional space, each phase vector can now be represented as the following:

$$\sum_{i=1}^{16} (\text{Projection\_i} * \text{base\_phase\_vector\_i})$$

Where projection_i is the projection of the measured phase vector onto the $i^{th}$ base phase vector (base_phase_vector_i), and where base_phase_vector_i is orthogonal to base_phase_vector_j if i does not equal j.

By cleverly selecting the set of 16 base vectors, for each measured phase vector, most of the information associated with the phase vector of a signal can be retained with only a small subset of the 16 base vectors (for example, m out of 16, with m<16). In other words, for the above equation, only a few proj_i are large while the rest of the projections are small.

Each AP can then report only the m largest projections to the cloud, which are later used by the cloud to weighted-sum the corresponding base AoA heat maps (base AoA heat maps are the precomputed AoA heat maps for the base phase vectors) and can reconstruct an AoA heat map for each AP. As a result, the total computation number now reduces to m/16 of the original value.

Finally, the embodiments can combine reconstructed heat maps of all APs together for location computation. Moreover, the embodiments can pre-compute the 16 base phase vectors and corresponding base AoA heat maps. It should be noted that only one set of base AoA heat maps need to be stored per frequency band, because by rotating and shifting the base phase vectors, we can create base AoA heat maps for all APs. During the location process, the projection computation happens at each AP, while the weighted-sum of base AoA heat maps and the device location search happen in cloud.

The base phase vectors roughly point to different angles. There are also side-lobes with each base phase vector to ensure that these base phase vectors are orthogonal with each other. In the cloud, the embodiments pre-compute the base AoA heat maps for each of the 16 base phase vectors. It should be noted that this pre-computation only needs to be done and stored for the first AP, because the base AoA heat maps of the other APs can be derived by rotating and shifting the base AoA heat maps of the first AP.

During location, after each AP sends the top m projection values to the cloud, the cloud can weighed-sum the corresponding base AoA heat maps to reconstruct the AoA heat map of each AP. Because only m base AoA heat maps are used, the total number of computations reduces to m/n of its original value, with n being the number of antennas at AP.

FIG. 1 shows an operating environment 100 for determining a physical location of a user device 155 that is communicating with APs in the network 110. As shown in FIG. 1, operating environment 100 may comprise a Location server 105 and a network 110. Location server 105 may collect information about network 110 and provide that information to provide user experiences through the Location server processes and applications. The location information can be used to determine a user's location physically, which may be used to provide some type of experience to the user at the determined location. Location server 105 may also provide those user experiences. Location server 105 may be located inside or outside network 110, for example, in a cloud environment.

Network 110 may comprise, but is not limited to, an enterprise network that may comprise an enterprise's communications backbone that may connect computers and related devices across departments and workgroup networks, facilitating insight and data accessibility. As shown in FIG. 1, network 110 may comprise a router 115, a first network device 120A, a second network device 120B, and a third network device 120C. A plurality of end use devices 135 may be connected to one or more of the network devices 120. The first plurality of end use devices 135 may comprise at least a first end use device 155. Generally, the network devices 120 are access points. An AP 120 can be any hardware device or configured node on a local area network (LAN) that allows a wireless capable device 155 and wired networks to connect through a wireless standard, including Wi-Fi or the BLUETOOTH wireless technology standard. APs 120 can feature a processor, radio transmitters, and antennae, which facilitate connectivity between devices 155 and the network 110. APs 120 can be as described in conjunction with FIG. 11.

The router 115 may comprise a Wide Area Network (WAN) router that may connect network 110 to an external network, for example, the Internet. When Location server 105 is located outside network 110, router 115 may connect Location server 105 with network devices (e.g., AP 120) in the network 110.

Each of user devices 155 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using network 110.

The elements described above of operating environment 100 (e.g., Location server 105, router 115, AP 1 120A, AP 2 120B, AP 3 120C, end user device 155, etc.) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 11, the elements of operating environment 100 may be practiced in a computing device 1100.

Consistent with embodiments of the disclosure, AP 120 may be in communication with a user device 155 in which the location of the user device 155 is desired. The physical location may be determined from a Real Time Location Service (RTLS). The functions of the RTLS may be split between the APs 120 and the location server 105. Accordingly, as described in greater detail below, embodiments of the disclosure may provide a process by which location services for determining a user device location may be conducted partly by the APs 120 and partly by the location server 105

Figure 2A:
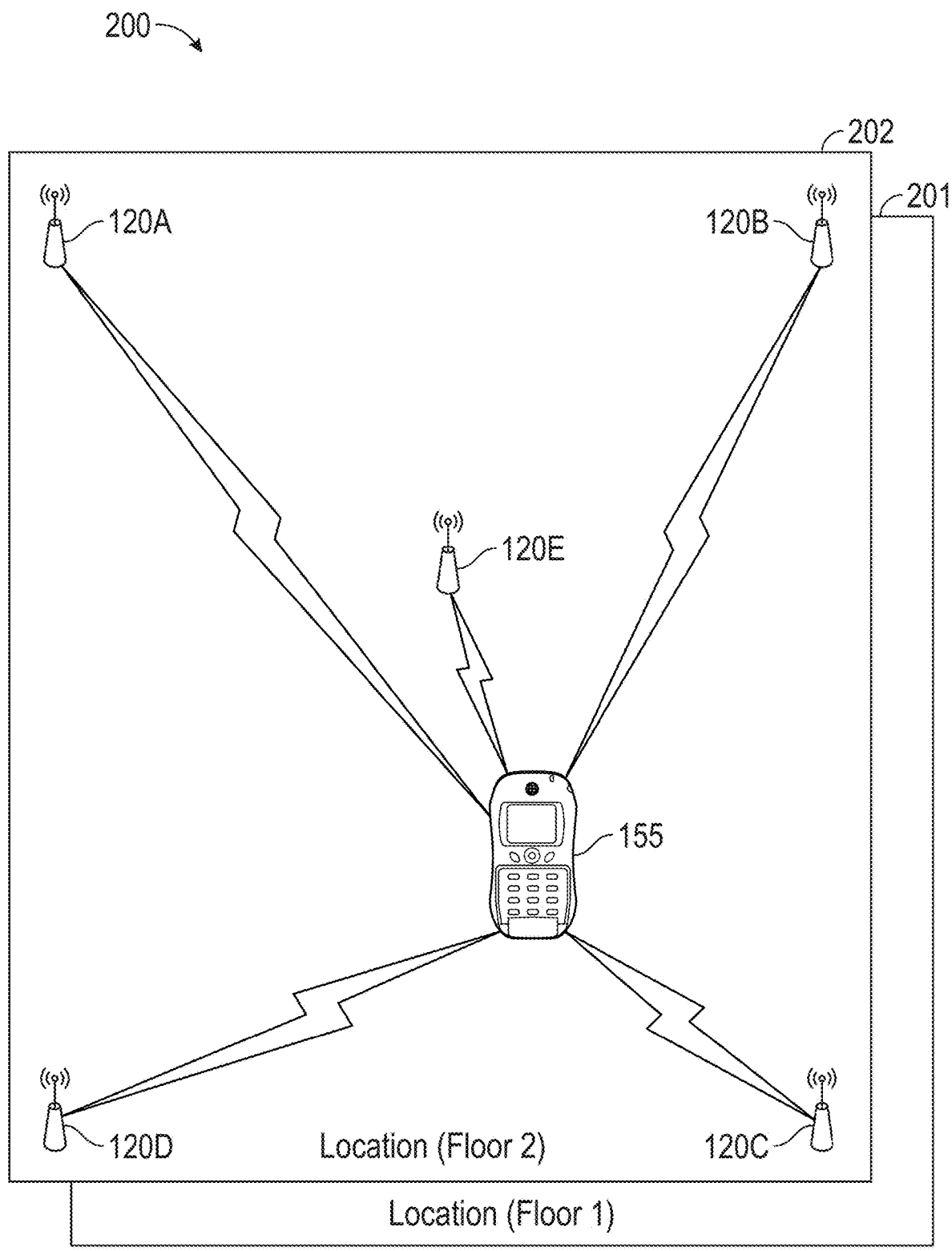
FIG. 2A shows a location, with more than one floor, where a device is located and where the device's location may be determined from information from APs at the location in accordance with aspects of the present disclosure.

FIG. 2A shows a location 200 having one or more APs 120A-120E. Each of the APs 120 may be located in a predetermined and known position within location 200. The APs 120 can communicate wirelessly with a mobile device 155. While the mobile device 155 is exemplary of other devices that may be in the location 200, while device 155 is mobile, it may be possible to communicate with other devices that are stationary to determine an initial position of such stationary devices. Each of the APs 120 can conduct at least a portion of the location services as described herein.

The location 200 can also have more than one floor, for example, floor 1 201 and floor 2 202. The presence of two or more floors complicates the location process. A simple X, Y coordinate may not accurately indicate the location of the device 155, which is on the second floor 202 of location 200. Thus, the APs 120 can also measure the RSSI of the signal received from the device 155. If the RSSI is over some predetermined threshold, the AP 120 can determine that the device 155 is on a same floor as the AP 120. In this way, at least a general indication of the "vertical" location (e.g., the floor the device 155 is on) of the device 155 is determined.

Figure 2B:
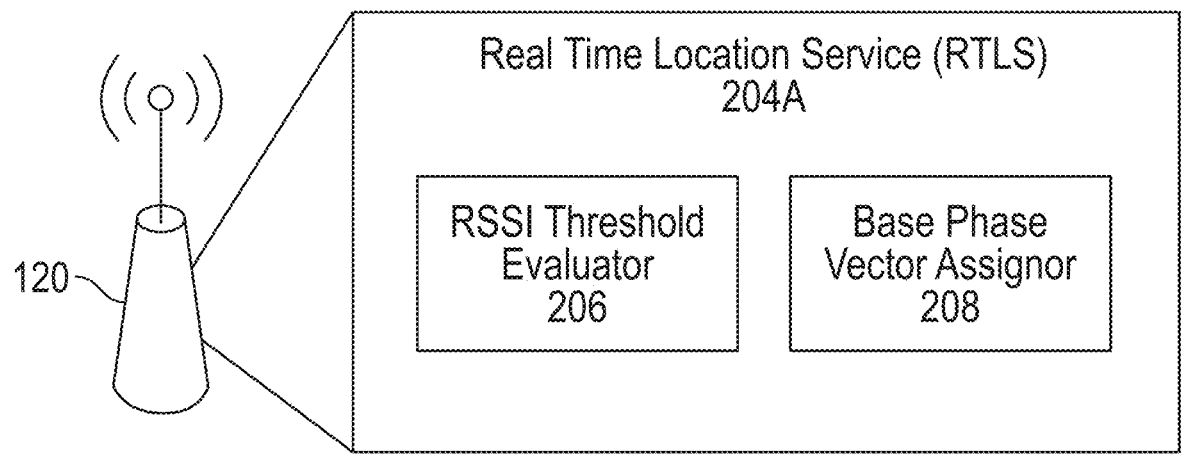
FIG. 2B is an example of an AP in accordance with aspects of the present disclosure.

FIG. 2B shows an example of an AP 120. The AP 120 can include at least a portion of the RTLS 204A. Thus, the RTLS 204A can include at least a portion of the hardware and/or software used to determine the location of a device 155 within location 200. In at least some configurations, the AP 120 may include a RSSI threshold evaluator 206 and a base phase vector assigner 208. The RSSI threshold evaluator 206 can receive an RSSI threshold from the location server 105. The RSSI is a measure of signal strength, which can be measured or determined for incoming signals from the device 155. The RSSI threshold evaluator 206 can compare this measured signal to the received threshold. If the measured signal is above the threshold, the RSSI threshold evaluator 206 can determine that the device 155 is on a same floor 202 as the AP 120 and allow the location process to determine an X, Y location for the device 155 on the floor 202.

The base phase vector assigner 208 can receive a set of base phase vectors from the location server 105. The base phase vectors may be as described in conjunction with FIG. 4A. When receiving a signal from the device 155 and determining the device's location, the base phase vector assigner 208 can conduct searches or determine the best base phase vectors that correlate to the AoA of a signal from the mobile device 155. The AoA of the signal from the mobile device 155 may be determined by the Time Of Arrival (TOA) and/or the RSSI of the signal from the mobile device 155 as the signal reaches the one or more antennas associated with the AP 120.

The base phase vector assigner 208 can then determine at least one base phase vector that correlates with the AoA of the signal from the mobile device 155 to be forwarded to the location server 105. The base phase vector assigner 208 can assign a projection value to the base phase vector(s) and provide the projection value to the location server 105 to recompose a heat map associated with the device's signal. In this way, a reduced amount of processing is done on the AP 120 and less communication traffic is needed between the AP 120 and the location server 105.

Figure 2C:
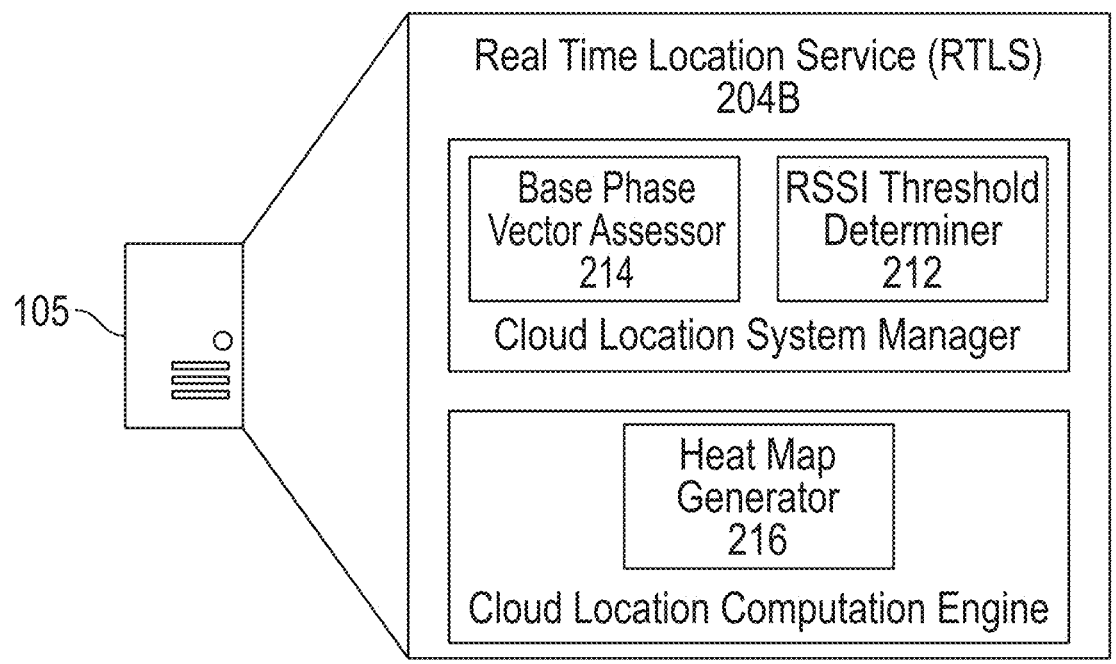
FIG. 2C is an example of a location server in accordance with aspects of the present disclosure.

An exemplary embodiment of the location server 105 may be a shown in FIG. 2C. The location server 105 can include at least a second portion or the remainder of the RTLS 204B. The RTLS 204B can be, within the location server 105, any software and/or hardware. Generally, the RTLS 204B can include one or more of, but is not limited to, a RSSI threshold determiner 212 (which can be a part of a Cloud Location System Manager), a base phase vector assessor 214 (which can also be a part of a Cloud Location System Manager), and/or a heat map generator 216 (which can be a part of a Cloud Location Computation Engine). The RSSI threshold determiner 212 can determine, from past RSSI measurements and location determinations of devices within location 200, the RSSI threshold to be used by one or more APs 120 on each floor of the location 200 to determine that a device 155 is on the same floor as the APs 120. As such, the location server 105 can send an AP-specific RSSI threshold for each AP 122 to compare to a measure or received RSSI of the signal from a mobile device 155. The function of the RSSI threshold may be as described hereinafter.

Figure 4A:
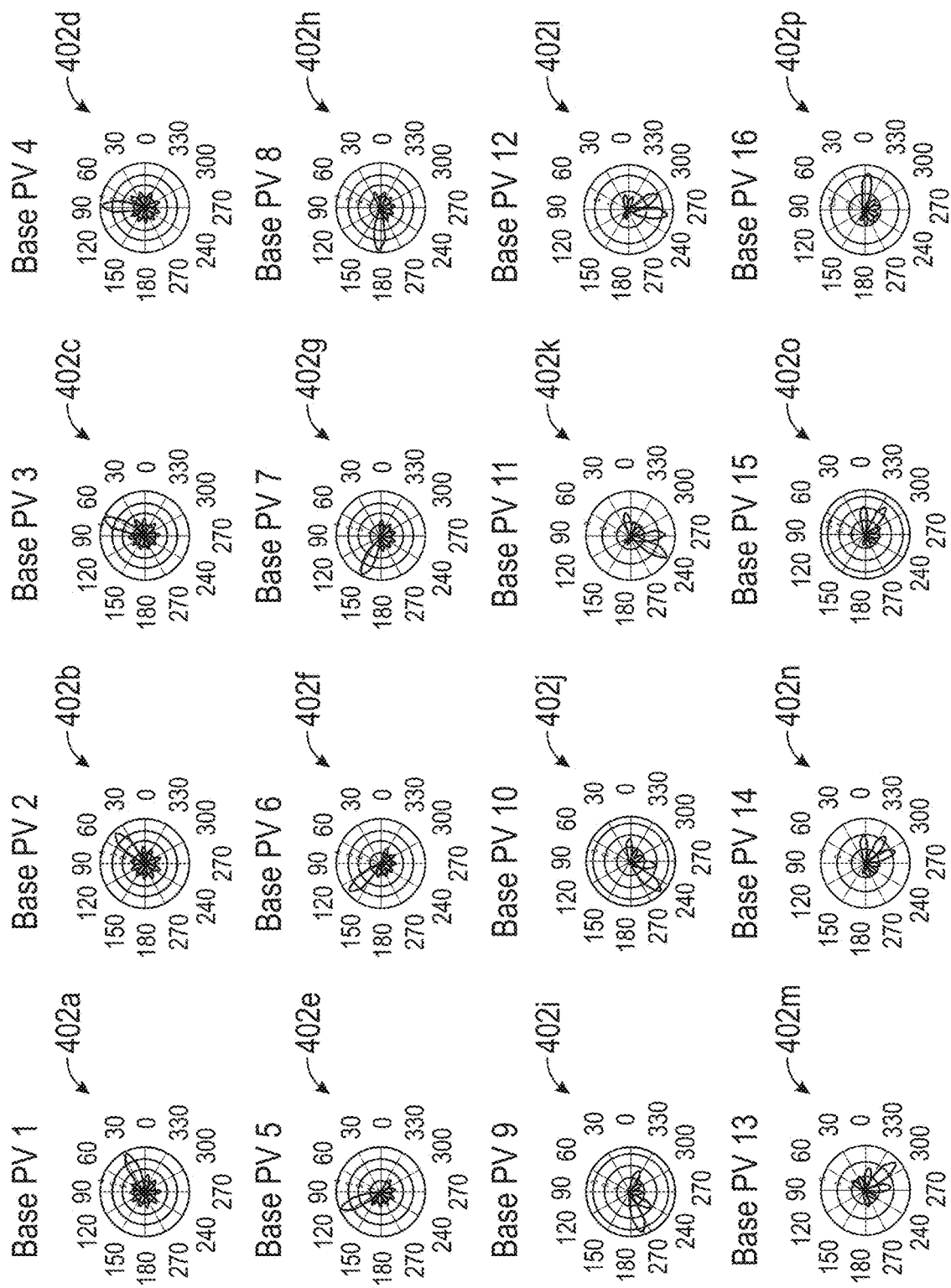
FIG. 4A shows a set of base phase vectors in accordance with aspects of the present disclosure.

The base phase vector assessor 214 can determine a set of base phase vectors for an AP 120. An exemplary set of base phase vectors may be as shown in FIG. 4A. The first set of base phase vectors may then be modified by the base phase vector assessor 214, by rotating and aligning the base phase vectors, to apply to the other APs 120. As such, a customized set of base phase vectors for each AP 120 can be generated by the base phase vector assessor 214 and sent to the applicable AP 120.

The heat map generator 216 can receive the location information from two or more of the APs 120. From the AOA information, the heat map generator 216 may be capable of determining a likely position of the device 155 within the location 200. Thus, the heat map generator 216 is operable to determine a coordinate position based on the projection of the measured phase vectors on the base vectors, as described hereinafter. This data helps determine the likely location of the mobile device 155 based on the known locations of the different APs 120.

Figure 3A:
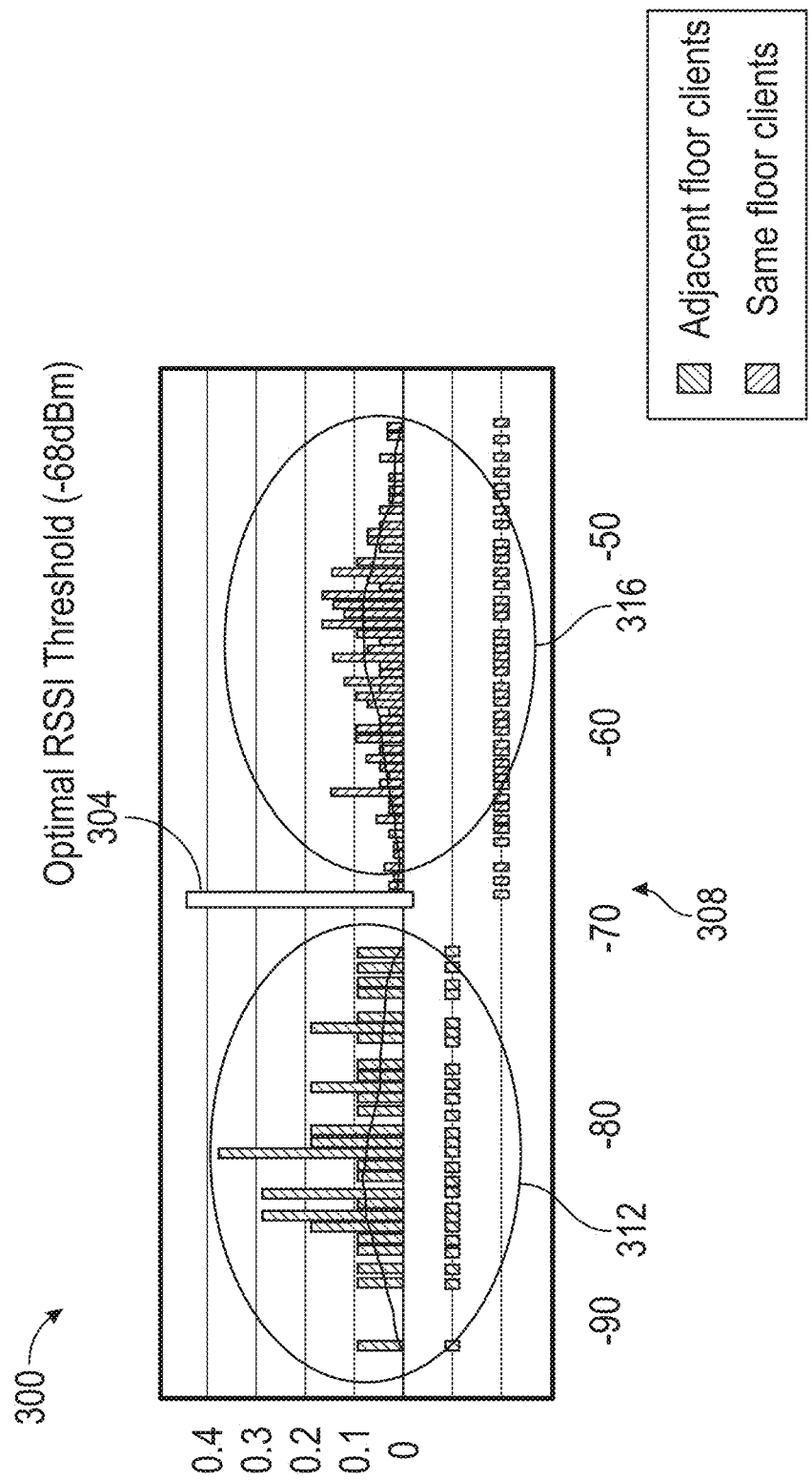
FIG. 3A shows an example set of Received Signal Strength Indicator (RSSI) measurements from devices on more than one floor of a location and a corresponding RSSI threshold in accordance with aspects of the present disclosure.

An example of the RSSI results 300 and an exemplary RSSI threshold 304 for a first AP 120 may be a shown in FIG. 3A. The AP 120, for example AP 120D, may be on a second floor 202 and isolated from any large opening to the floor below 201. Thus, it may not be possible for AP 120D to receive signals, with high RSSI values, from devices on a first floor 201. Thus, signals from devices on a first floor 201 may be included in group 312, where these signals have a lower RSSI as placed on the horizontal axis 308 measured in decibels (dBs). In contrast, the signals from devices on the second floor 202 with the AP 120D may be in group 316 with higher dB values.

Based on these measurements, the location server 105 can establish a RSSI threshold 304. The RSSI threshold 304 can be compared to received signals from devices. If the RSSI of the signal is above the threshold, the AP 120D can determine that the devices is on the same floor, e.g., the second floor 202, with the AP 120D. Likewise, if the RSSI of the signal is below the RSSI threshold 304, the AP 120D can determine that the device is on a different floor, e.g., floor 1 201, and forego providing a location for this device. Using the RSSI threshold 304, each AP 120 can make a determination of the vertical position of the device and provide a location only when the device is on the same floor, which make the location determinations more accurate.

Figure 3B:
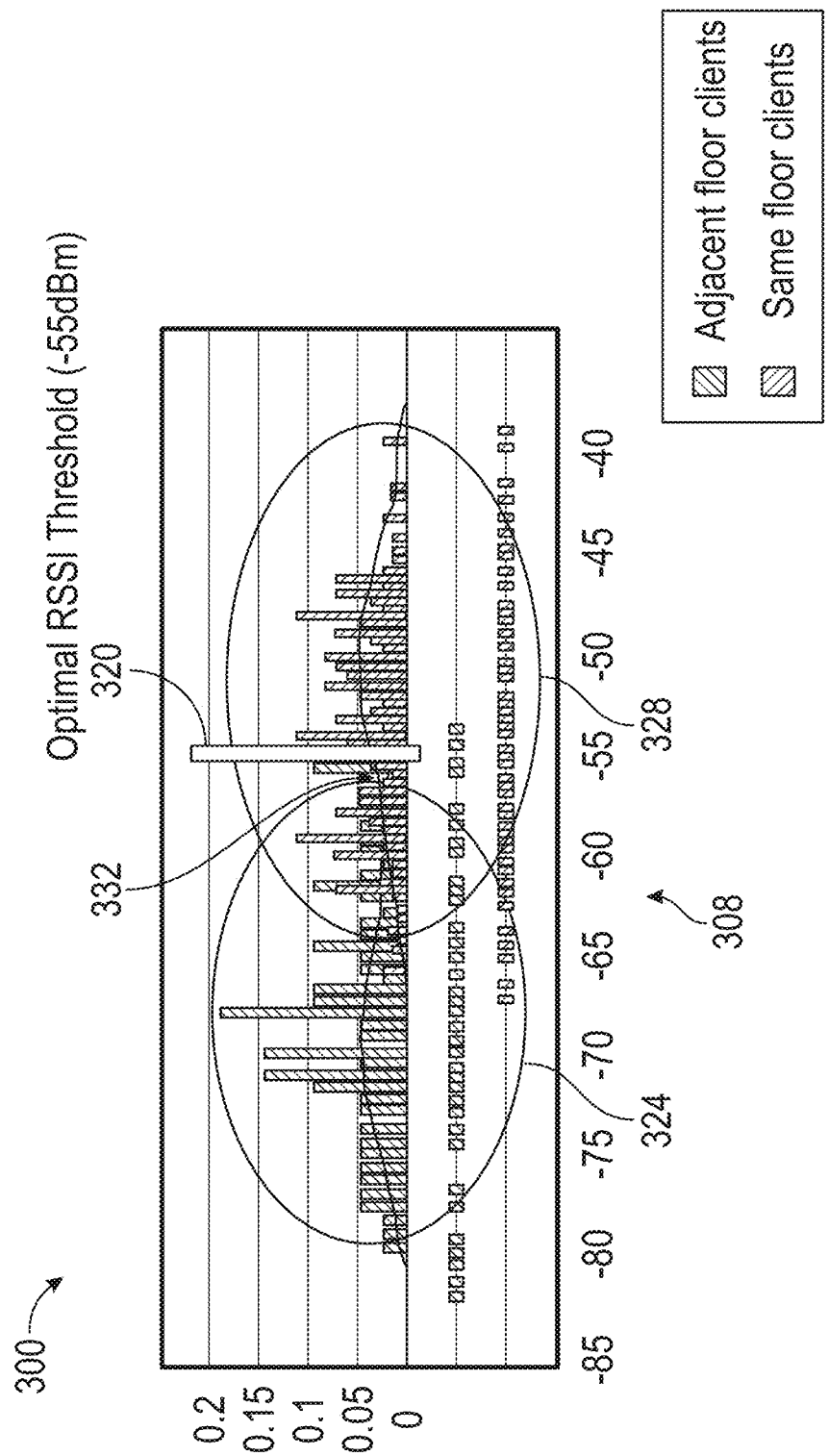
FIG. 3B shows another example set of RSSI measurements from devices on more than one floor of a location and a corresponding RSSI threshold in accordance with aspects of the present disclosure.

Another example of the RSSI results 316 and another exemplary RSSI threshold 320 for a second AP 120 may be a shown in FIG. 3A. The AP 120, for example AP 120A, may be on a second floor 202 but nearer a large opening to the floor below 201. Thus, AP 120A can receive signals, with higher RSSI values, from devices on a first floor 201. Signals from devices on a first floor 201 may be included in group 324, where at least some of these signals have a lower RSSI as placed on the horizontal axis 308. However, some of the signals in group 324 have higher RSSI values although the devices are on the first floor 201. In contrast, the signals from devices on the second floor 202 with the AP 120A may be in group 316 with higher dB values. As can be seen in FIG. 3B, the RSSI values for signals received from devices on the first floor 201 and the second floor 202 are intermixed, which makes setting the RSSI threshold 320 more difficult.

Based on the measurements 316, the location server 105 can establish a RSSI threshold 320 that is above the highest RSSI value 332 of a signal received from a device on a first floor 201. The placement of this RSSI threshold 320 ensures that no device on a first floor 201 will be determined to be on the second floor 202. However, some devices on the second floor 202 may be determined not to be on the second floor 202. As such, false positives are eliminated but false negatives occur. To compensate for this situation, the RSSI threshold determiner 212 can compare the results from AP 120A with results from other APs on the same floor 202, e.g., AP 120D. If the other AP believes the device to be on the second floor 202, location information from the AP 120A can be accepted.

As explained above, the RSSI threshold 320 can be compared to received signals from devices. If the RSSI of the signal is above the threshold, the AP 120A can determine that the devices is on the same floor, e.g., the second floor 202, with the AP 120A. Likewise, if the RSSI of the signal is below the RSSI threshold 320, the AP 120A can determine that the device may be on a different floor, e.g., floor 1 201. However, unlike the description above, AP 102A would send the received RSSI information and the location information to the location server 105 in case the determination was a false negative. The RSSI and location information can be sent from any AP 120 periodically or based on other determination to better improve the accuracy of the RSSI thresholds 304, 320. The updating of the RSSI threshold 320 is especially useful in situations as shown in FIG. 3B when the RSSI threshold is harder to determine.

An embodiment of a set 400 of example base phase vectors 402a-402p may be a shown in FIG. 4. Each base phase vector 402a-402p roughly points to a different azimuth angle. Side lobes may be included in the base phase vectors 402 to ensure that the bases are generally orthogonal to each other. The base phase vectors 402 can be rotated and aligned for each AP 120. Further, the base phase vectors 402 are associated with a corresponding heat map stored at the location server 105. Providing an indication of what base phase vector is most closely related to a measured phase vector allows the location server 105 to determine the best heat map to use for the location determination, as explained hereinafter.

Figure 4B:
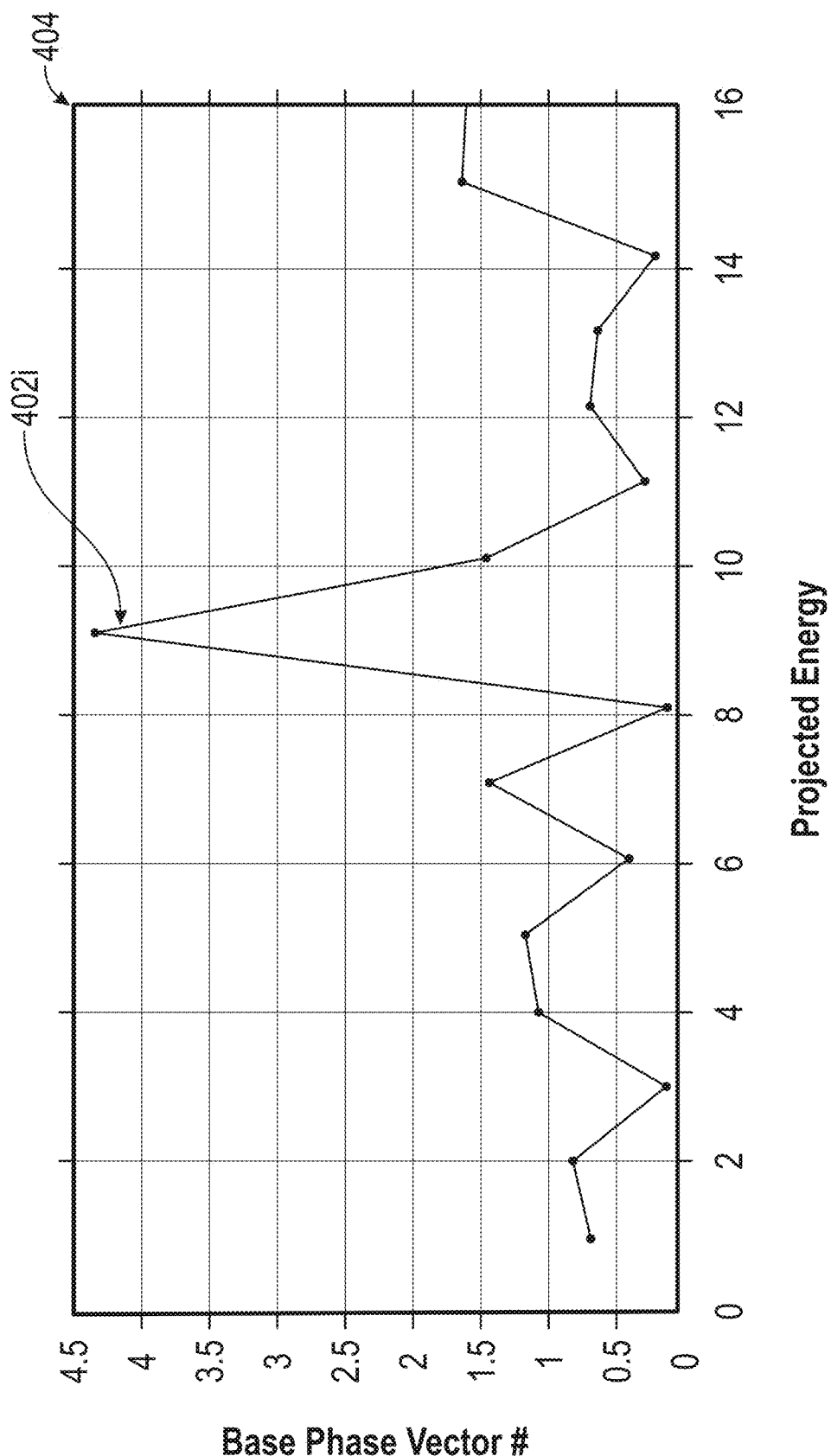
FIG. 4B shows a result of measured energy values as applied to a set of base phase vectors in accordance with aspects of the present disclosure.

The received phase vector of the signal from the device 155 can be evaluated against the base phase vectors to determine the closest match(es), as shown in chart 404 in FIG. 4B. Thus, the highest correlation, for example, base vector 9 402i indicates the AoA for the signal is most closely related to that base phase vector. The AP 120 can report one or more of the base phase vectors to the location server 105 to use one or more corresponding heat maps for the location determination.

Figure 5:
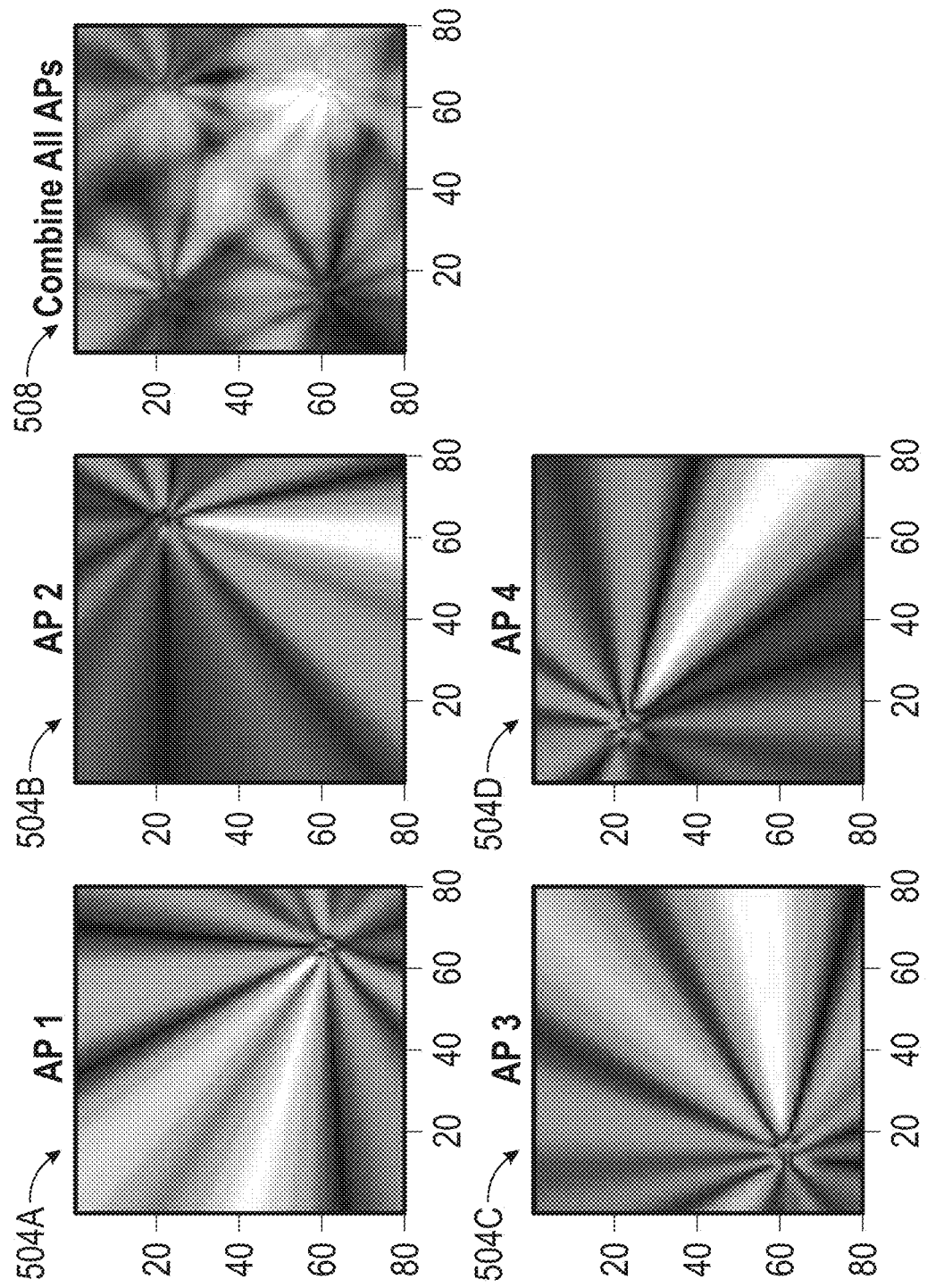
FIG. 5 shows visual representations of the base phase vector heat maps generated from projection values received from AP(s) and provided to the location server and a heat map generated from that information in accordance with aspects of the present disclosure.

Examples of the heat maps that may be generated based on the base phase vector output from various APs 120 may be as shown in FIG. 5. For example, each AP 120 may provide a set of the top base phase vectors. These base phase vectors are each associated with a heat map. The one or more heat maps from each AP may be combined and weighted based on the correlation to the base phase vector. The combined heat maps and weightings are represented by the bands shown in FIGS. 504A-504D. The brightness of the band, for example, light grey, represents a higher probability that the signal from the device 155 arrived at an AoA associated with that base phase vector 402. Thus, each AP 120 may provide a limited set of AOA information for that AP 120 and restricted to a number of top base phase vectors.

The location server 105 may then combine this heat map information from the APs 120 to form a combined heat map, for example, heat map 508. Thus, the combination of the various AOA information can be quickly assimilated into a heat map 508 that indicates, with relative accuracy, the location of the device 155 within location 200. This heat map 508 provides the most probable location of the device 155, and the location server 105 may send this physical position to other services or devices for use in other applications.

Figure 6:
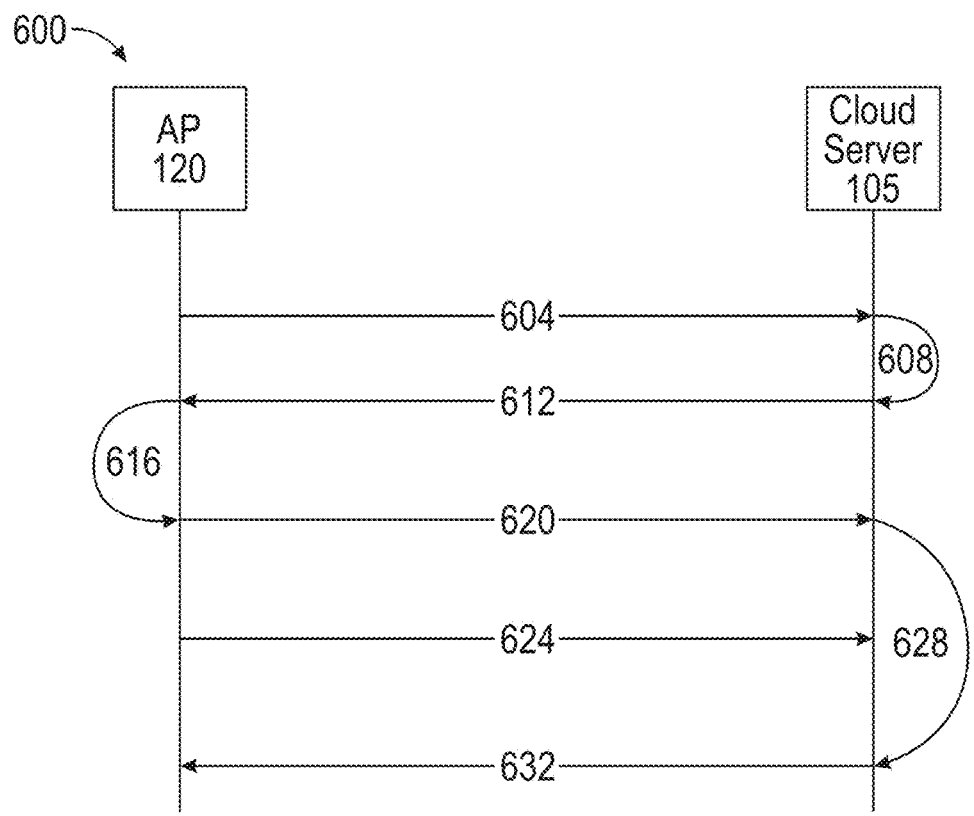
FIG. 6 shows a signaling diagram in accordance with aspects of the present disclosure.

FIG. 6 is a signalling diagram 600 that shows a least some of the communications between the AP 120 and the location server 105. The signals may be sent in various stages to determine the location of a device 155 within area 200. An AP 120 can send location information in signal 604. This initial signal(s) 604 can provide initial location information from other devices to allow the location server 105 to determine the RSSI threshold 304/320, in process 608. This previous location information, used to determine the RSSI threshold 304/320, is then composed into a directive to the AP 120 in signal 612 and sent to the AP 120.

From the information in signal 612, the AP 120 can filter out signals from devices with an RSSI below the RSSI threshold 304/320. The location determination for a new device 155 can occur in stage 616. The location information, from devices that have an RSSI above the threshold, may be sent from the AP 120 to the location server 105 in signal 624. However, location information, from devices that have an RSSI below the threshold, may either not be sent or may be sent from the AP 120 to the location server 105 in signal 620. Signal 620 may include RSSI information and location information. From the new RSSI information in signal 620, the location server 105 may refine the RSSI threshold 304/320. The refined or adjusted RSSI threshold 304/320 can then be sent back to the AP 120 in signal 632 for user in future comparisons to the RSSI threshold 304/320.

Figure 7:
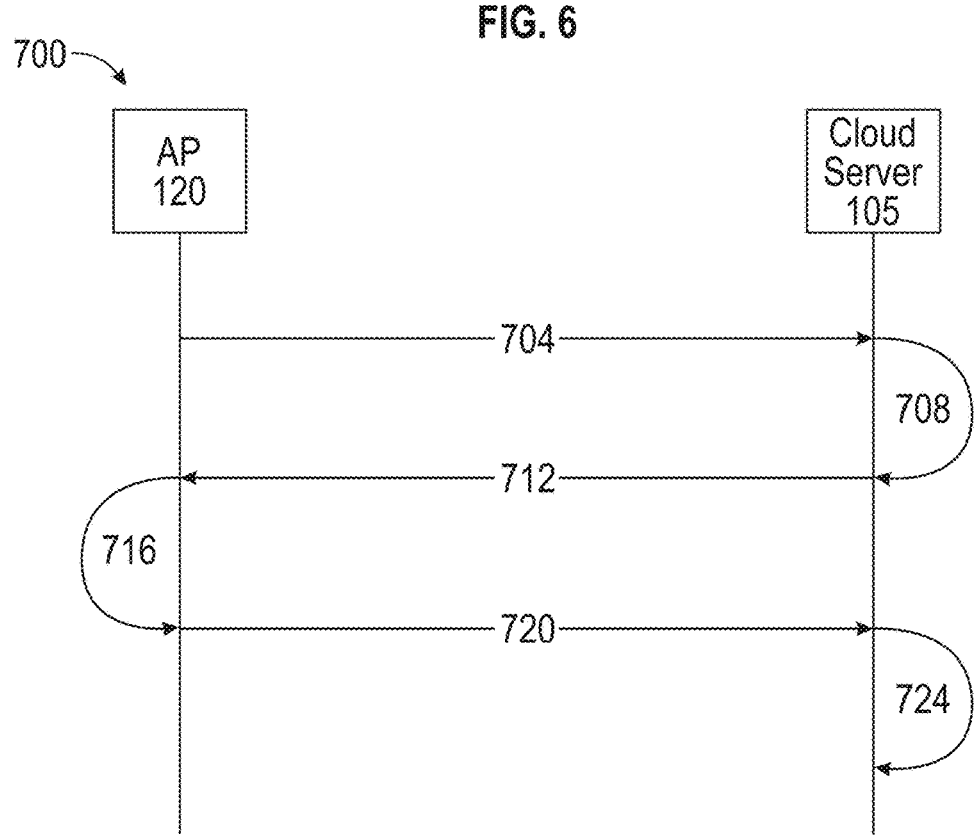
FIG. 7 shows another signaling diagram in accordance with aspects of the present disclosure.

FIG. 7 is another signalling diagram 700 that shows a least some of the other communications between the AP 120 and the location server 105. The signals may be sent in various stages to determine the location of a device 155 within area 200. An AP 120 can send location information in signal 704. This initial signal(s) 704 can provide initial location information from other devices to allow the location server 105 to determine a set 400 of base phase vectors 402 for the AP 120 in process 708. This previous location information, used to determine the set 400 of base phase vectors 402. The set 400 of base phase vectors 402 is then composed into a directive to the AP 120 in signal 712 and sent to the AP 120.

From the set 400 of base phase vectors 402 in signal 712, the AP 120 can compare the received signals phase vector to the set 400 of base phase vectors 402 to locate device 155. The similar base phase vectors 402 determination for a new device 155 can occur in stage 716. The base phase vectors 402 information from this determination may be sent in signal 720 back to the location server 105. The base phase vectors 402 information in signal 720, from the various APs 120, can be used to compose the heat map 508 in process 724. This heat map can indicated a physical location for the device 155, which location can be provided to other processes or devices.

Figure 8A:
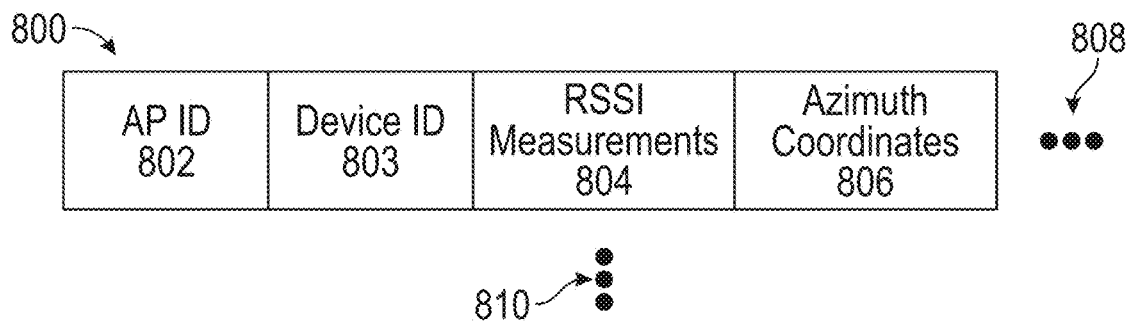
FIG. 8A shows a data structure stored, sent, received, or retrieved to determine a location of a user device in accordance with aspects of the present disclosure.

FIG. 8A is a data structure 800 that may be an example of the data included in signal 604 or signal 620. The data structure 800 can include one or more of, but is not limited to an AP Identifier (ID) 802, device ID 803, an RSSI measurement 804, and/or azimuth coordinates 806. The data structure 800 can include more or fewer fields than those shown in FIG. 8A, as represented by ellipses 808. Further, each AP 120, in the location 200, can send a data structure 800, and thus, there may be more data structures provided than that shown in FIG. 8A, as represented by ellipses 810, based on the number of APs 120 in the location 200.

The AP ID 802 can represent any type of identifier that uniquely identifies the AP 120 from other APs 120 in the network 110. Thus, the AP ID 802 can be a numeric ID, and alphanumeric ID, an Internet Protocol (IP) address, a MAC address, or some other address or ID used by the location server 105 to send the signal 712 to the AP 120 and recognize which AP 120 is sending the AoA information in signal 720.

The device ID 803 can represent any type of identifier that uniquely identifies the device 155 from other devices in the network 110. Thus, the device ID 803 can be a numeric ID, and alphanumeric ID, an Internet Protocol (IP) address, a MAC address, a phone number, or some other address or ID used by the AP 120 and location server 105 to identify the device 155 for location services with the AP 120 and the location server 105.

The RSSI measurement(s) 803 can be a measurement of the RSSI for a signal associated with a signal from the device 155. As explained previously, past location and RSSI determinations or measurements 804 from the APs 120 may be provided to the location server 105. With the device ID 803, the location server 105 can review the RSSI measurements 804 and location determinations from APs 120 on the same floor. From this information, the location server 105 can determine whether the device is on the same floor as the AP 120 sending the information. After some number of RSSI measurements 804 are received, the location server 105 can establish the RSSI thresholds 810 for the AP 120 based on filtering out signals likely sent from a device on another floor.

The azimuth coordinates 806 can be an identification or designation of the location of a device for which the AP 120 has monitored. As explained previously, past AoA determinations 806, from the APs 120, may be used to determine a location of a device previously. These past measurements 806 may help in determining the best base phase vectors 822. An AP 120 may receive signals more often from a device 155 in some portion of the AP's area of coverage because of the physical environment in which the AP 120 operates. This information may be evidenced from the past azimuth measurements 806 and can help inform the selection of a base set of phase vectors.

Figure 8B:
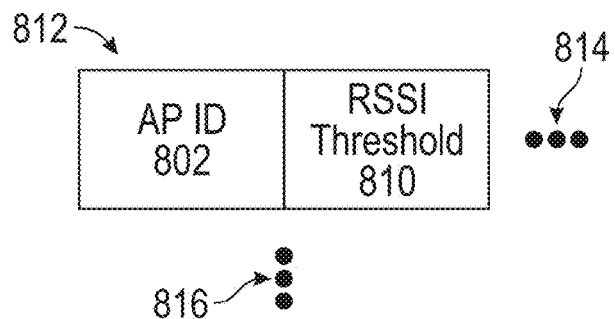
FIG. 8B shows another data structure stored, sent, received, or retrieved to determine a location of a user device in accordance with aspects of the present disclosure.

FIG. 8B is another data structure 812 that may be an example of the data included in signal 612 or signal 632. The data structure 812 can include one or more of, but is not limited to the AP ID 802 and/or a RSSI threshold 810. The data structure 812 can include more or fewer fields than those shown in FIG. 8B, as represented by ellipses 814. Further, each AP 120 in the location 200 can send a data structure 812, and thus, there may be more data structures provided than that shown in FIG. 8A, as represented by ellipses 816. The AP ID 802 may be as previously described with data structure 800, and thus, will not be explained further.

The RSSI threshold 810 can be an RSSI value, likely in dBs, to which the AP 120 is to compare the RSSI measured from incoming signals. The RSSI threshold 810 is set by the location server 105, as explained previously, so that the AP 120 can filter out signals from devices not on the same floor as the AP 120. Thus, the AP 120 need not determine the location of a device with a signal below the RSSI threshold 810. However, in some circumstances, the AP 120 may still determine the location of devices with a signal below the RSSI threshold 810. In these situations, the AP 120 may send the location information with the RSSI measurement 804 back to the location server 195.

Figure 8C:
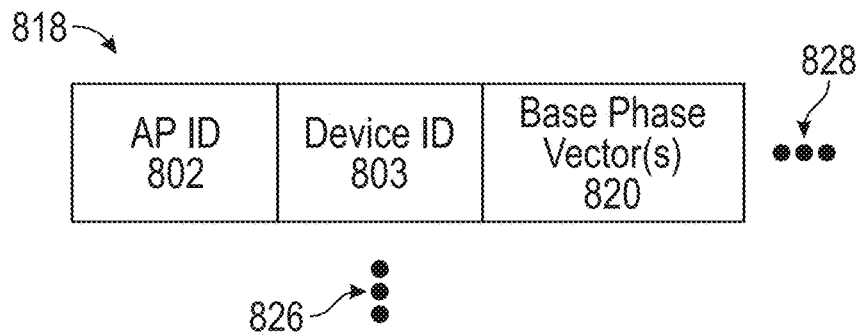
FIG. 8C shows another data structure stored, sent, received, or retrieved to determine a location of a user device in accordance with aspects of the present disclosure.

FIG. 8C is another data structure 818 that may be an example of the data in signal 712 as provided from the location server 105 to the AP 120. The data structure 818 can include one or more of, but is not limited to, the AP ID 802, the device ID 814, and/or a set of base phase vectors. The data structure 818 can include more or fewer fields than those shown in FIG. 8C, as represented by ellipses 828. Further, each device 155 in the location 200 can have a different location, and thus, there may be more data structures 818 provided than that shown in FIG. 8C, as represented by ellipses 826. The AP ID 802 and device ID 814 may be as previously described with data structure 800, and thus, will not be explained further.

The set of base phase vectors 820 can include any of the information required by the AP 120 to describe the base phase vectors 402. This information can include an identifier for the base phase vector 402 and other associated information. For example, the base phase vector information can include one or more of a complex number, data representing a sinusoidal function whose Amplitude (A), angular frequency (ω), and initial phase (θ) are time-invariant. Regardless of the information that could be provided, the information in the set of base phase vectors 820 allows the AP to compare a measured phase vector to each of the base phase vectors in the set of base phase vectors 820.

Figure 8D:
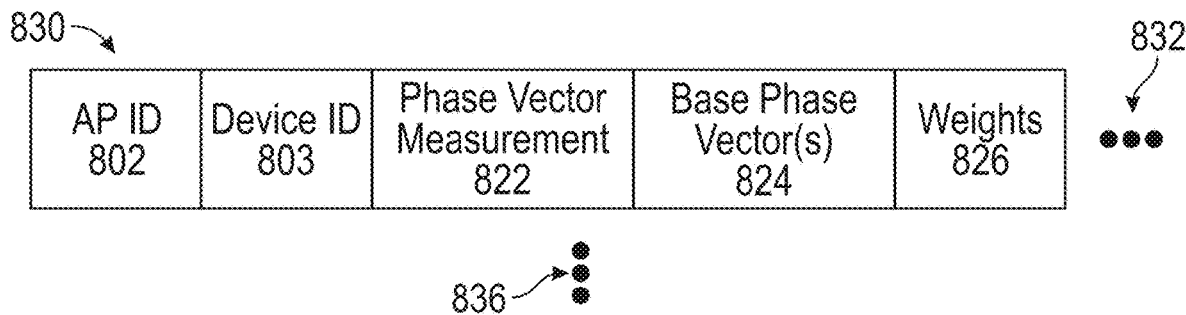
FIG. 8D shows another data structure stored, sent, received, or retrieved to determine a location of a user device in accordance with aspects of the present disclosure.

FIG. 8D is another data structure 818 that may be an example of the data determined by and provided from AP 120 in signal 720. The data structure 830 can include one or more of, but is not limited to, the AP ID 802, the device ID 814, a phase vector measurement 822, one or more base phase vectors 824, and/or weights 826. The data structure 830 can include more or fewer fields than those shown in FIG. 8D, as represented by ellipses 832. Further, each device 155 in the location 200 can have a different location, and thus, there may be more data structures 830 provided than that shown in FIG. 8C, as represented by ellipses 836. The AP ID 802 and device ID 814 may be as previously described with data structures 800 and/or 812, and thus, will not be explained further.

The phase vector measurement 820 can be a measurement of the phase vector for a signal received from a device 155 as calculated by the AP 120. The phase vector measurement 820 may be stored by the AP 120 for comparison to the set of base phase vectors 820. As such, the phase vector measurement 820 is at least somewhat similar to one or more base phase vectors 402, as shown in FIG. 4.

The base phase vector(s) 822 are a subset of one or more of the base phase vector(s) 820. The base phase vector(s) 822 include the base phase vectors 402 that are most similar to the phase vector measurement 820. The number of base phase vector(s) 822 to include in the subset may be based on a setting provided from the location server 105, from user input, as set by a factory, or based on other input. Each of these base phase vector(s) 822 also relates or is associated with a heat map for that base phase vector(s) 402. The various heat maps associated with the base phase vector(s) 822 can be combined into a combined heat map, e.g., heat map 504, as shown in FIG. 5. These combined heat maps can then be further combined for all APs to obtain the heat map 508 which indicates a location of the user device 155.

The weight 826 can be a value for the projection of the phase vector measurement 820 onto the base phase vector(s) 822. The more closely related, the higher the projection value. Thus, the location server 105 can use this projection value to weight or consider more the heat map associated with the base phase vector(s) 822 with higher projection values. The weight 826 or projection value can have any type of value, for example, a decimal number between 0 to 1, 1 being the highest.

Figure 9A:
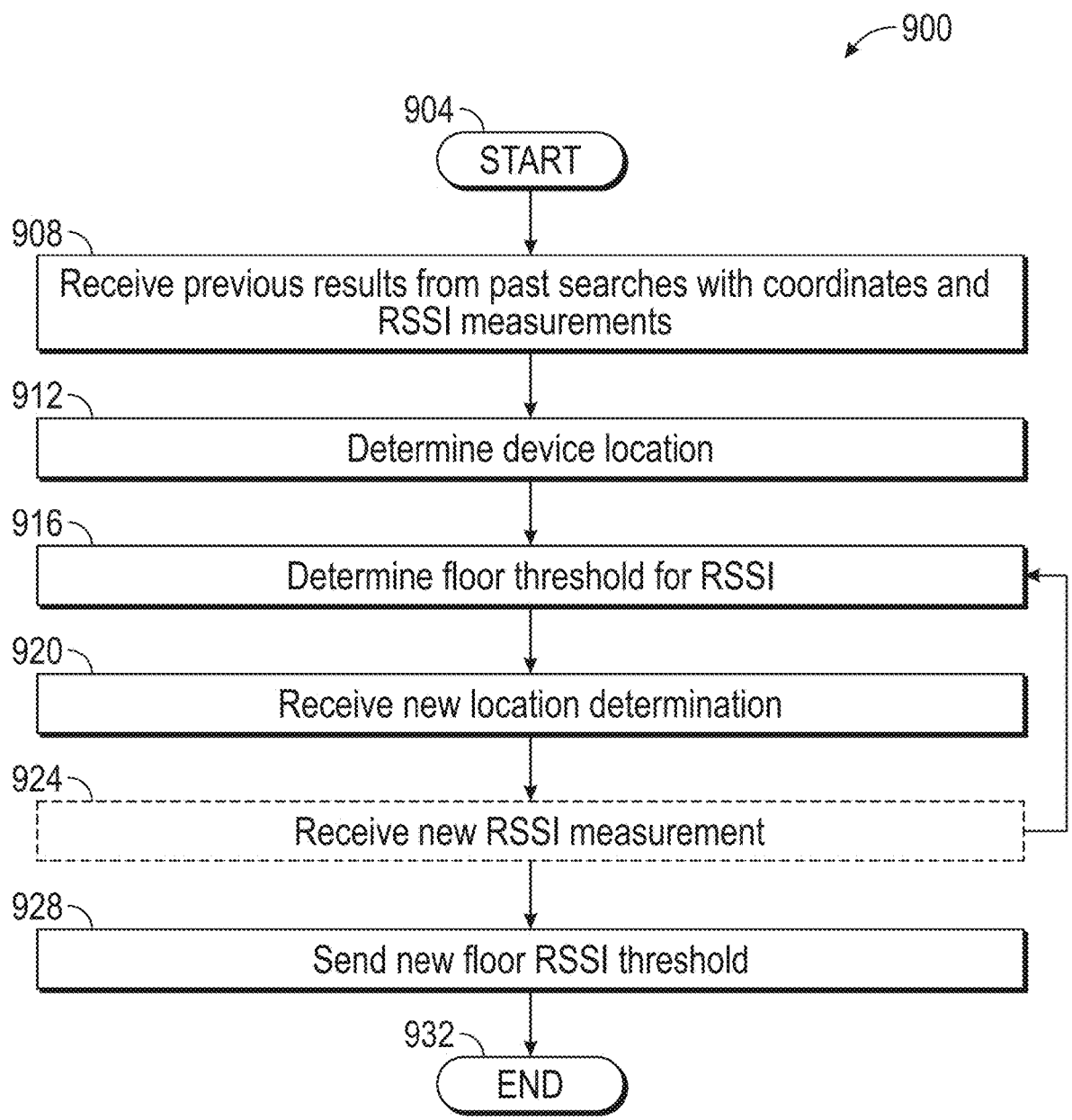
FIG. 9A is a method, conducted by the location server, for determining a location of a user device in accordance with aspects of the present disclosure.

An embodiment of a method 900, as conducted by the location server 105, for determining a location of a user device 155 may be as shown in FIG. 9A. A general order for the stages of the method 900 is shown in FIG. 9A. Generally, the method 900 starts with a start operation 904 and ends with an end operation 932. The method 900 can include more or fewer stages or can arrange the order of the stages differently than those shown in FIG. 9A. The method 900 can be executed as a set of computer-executable instructions executed by a computer system and encoded or stored on a computer readable medium. Further, the method 900 can be performed by gates or circuits associated with a processor, an Application Specific Integrated Circuit (ASIC), a Field Programmable Gate Array (FPGA), a System-On-Chip (SOC), or other hardware device. Hereinafter, the method 900 shall be explained with reference to the systems, components, devices, modules, software, data structures, heat maps, methods, etc. described in conjunction with FIGS. 1-8 and 9B-11.

The location server 105 can receive, from at least one of the APs 120 connected to the network 110, a location determination (coordinates) and a RSSI measurement, as signal 604, in stage 908. This result may be associated with a past search. These past search results or past location determinations may be saved by the location server 105 and associated with the AP 120 that provided the information. For each device 155, the location server 105 can determine the location of the device 155, in particular, the floor on which the device 155 is located, in stage 912.

After some number of locations and RSSI measurements are received, the location server can determine the RSSI threshold 810 to which an AP 120 can determine if a device 155 is no a same floor 202, in stage 916. The determination in stage 916 may be made through various processes or algorithms, including, but not limited to, logistic regression or just maximum likelihood. This determined RSSI threshold may then be sent, in stage 928, as signal 612.

Further, in some configurations, the AP 120 may use the RSSI threshold to determine if a device is on the same floor with the AP 120. However, when the RSSI of the signal is below the RSSI threshold, the AP 120 can send new location information and RSSI information. Thus, the location server 105 may receive a new location determination, in step 920. The location determination may be as described below. However, the location server 105 may also receive a new RSSI measurement, in optional stage 924. If new RSSI information is received, the process 900 may repeat the determination of the RSSI threshold, in stage 916.

Figure 9B:
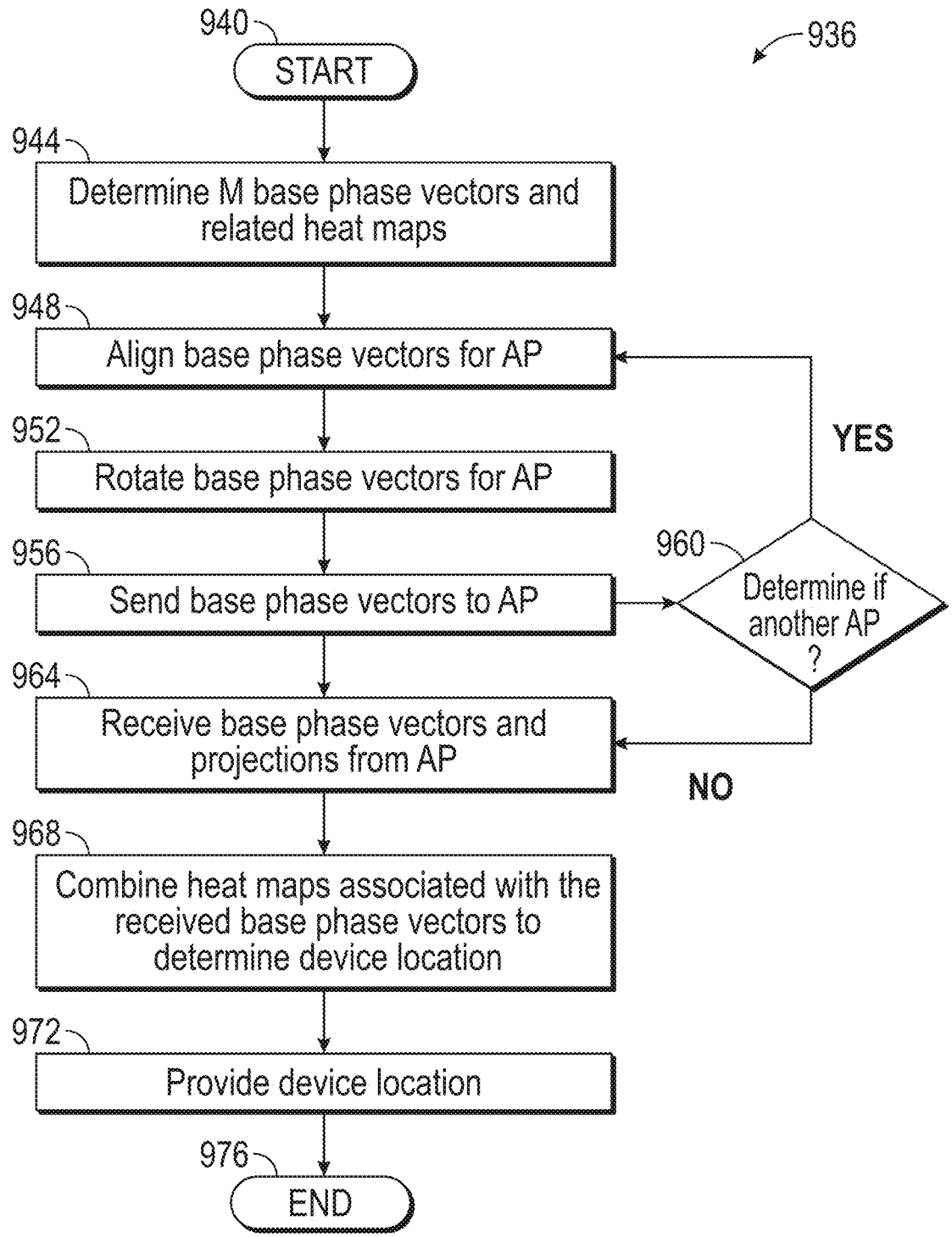
FIG. 9B is another method, conducted by the location server, for determining a location of a user device in accordance with aspects of the present disclosure.

An embodiment of a method 936, as conducted by the location server 105, for determining a location of a user device 155 may be as shown in FIG. 9B. A general order for the stages of the method 936 is shown in FIG. 9B. Generally, the method 936 starts with a start operation 940 and ends with an end operation 976. The method 936 can include more or fewer stages or can arrange the order of the stages differently than those shown in FIG. 9B. The method 936 can be executed as a set of computer-executable instructions executed by a computer system and encoded or stored on a computer readable medium. Further, the method 936 can be performed by gates or circuits associated with a processor, an ASIC, a FPGA, a SOC, or other hardware device. Hereinafter, the method 936 shall be explained with reference to the systems, components, devices, modules, software, data structures, heat maps, methods, etc. described in conjunction with FIGS. 1-9A and 10A-11.

The location server 105 can receive, from at least one of the APs 120 connected to the network 110, a location determination result as signal 704. This result may be associated with a past search. These past search results or past location determinations may be saved by the location server 105 and associated with the AP 120 that provided the information. In at least some configurations, after some number of results are received, the location server 105 can determine a set of base phase vectors 400 for the AP 120, in stage 944.

For each subsequent AP 120 after the first AP 120, the location server 105 can align the base phase vectors for that AP, in stage 948, and rotate the base phase vectors for that AP 120, in stage 952. Likewise, the heat maps associated with the base phase vectors can also be aligned and rotated as necessary. These aligned and rotated base phase vectors 400 may then be sent to the AP 120, in stage 960, as signal 712. The location server 105 may then determine if there is another AP 120 that requires a set of base phase vectors 400, in stage 960. If another AP 120 needs the base phase vectors 400, the process may return "Yes" to stage 948. If no other AP 120 needs the base phase vectors 400, the process may proceed "No" to stage 964.

Then, the location server 105 can receive a signal 720 from an AP 120, in stage 964. The signal 720 can include a subset of the base phase vectors 824 and weights 826 associated with the base phase vectors 402 associated with AoA for a received signal at the AP 120. In at least some configurations, the location server 105 receives the subset of the base phase vectors 824 and weight 818 based on a predetermined number of base phase vectors 824 that are to be sent to the location server 105 from the AP 120.

From the base phase vectors 824, the location server 105 can retrieve the heat maps associated with the base phase vectors 824. These heat maps 504 can be combined into a combined heat map 508 to determine the device location, in stage 968. The retrieved heat maps may also be weight some of the base phase vectors 824 based on the weights 826, such that the more significant base phase vectors are more prominently shown. From the combined heat map 508, the location server can identify the device location in the location 200. This coordinate location may be provided to other services or devices that require the location to provide functionality to the user or others, in stage 972.

Figure 10A:
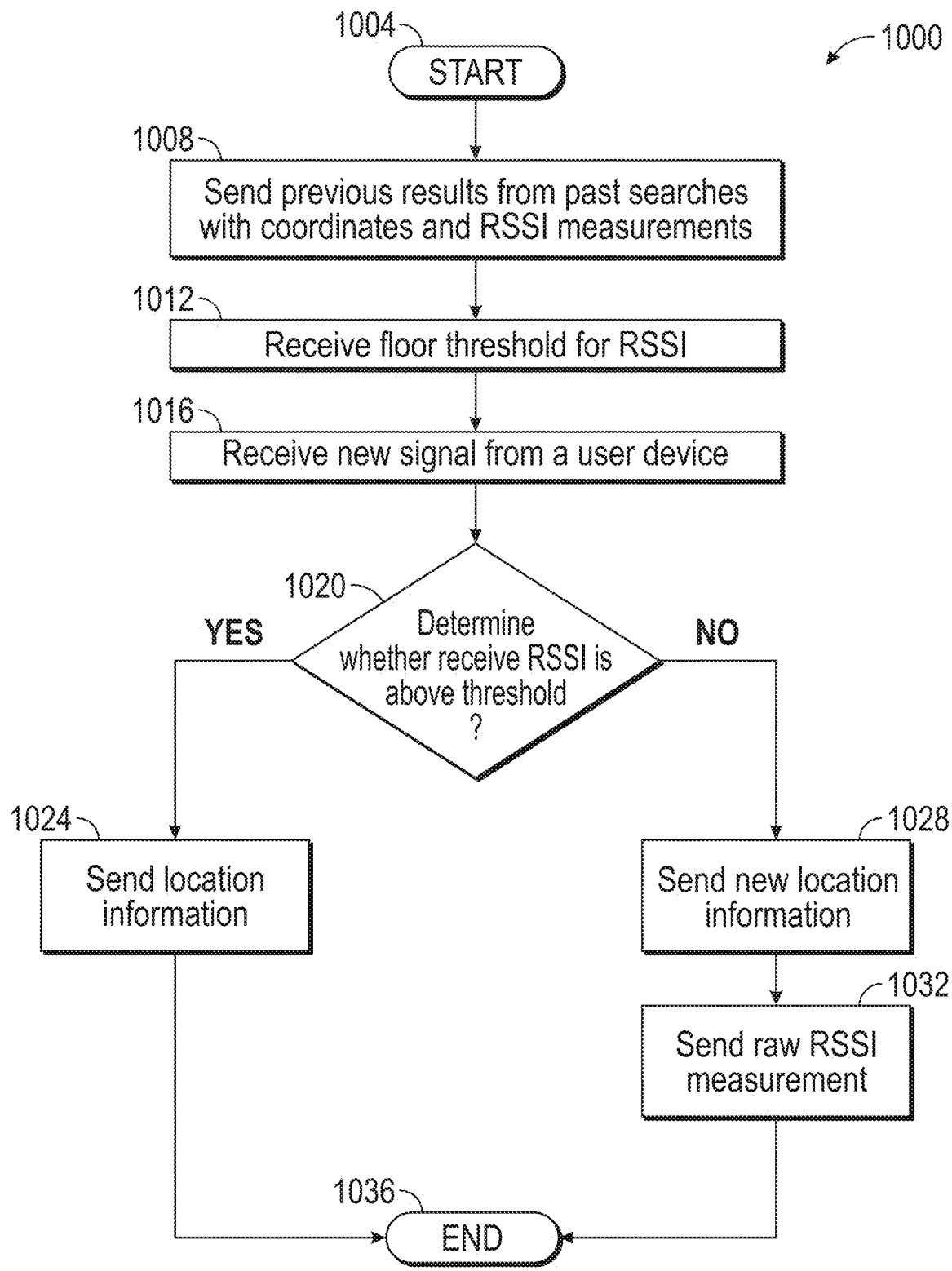
FIG. 10A is a method, conducted by an AP, for determining a location of a user device in accordance with aspects of the present disclosure.

An embodiment of a method 1000, as conducted by an AP 120, for determining a location of a user device 155 may be as shown in FIG. 10A. A general order for the stages of the method 1000 is shown in FIG. 10A. Generally, the method 1000 starts with a start operation 1004 and ends with an end operation 1036. The method 1000 can include more or fewer stages or can arrange the order of the stages differently than those shown in FIG. 10A. The method 1000 can be executed as a set of computer-executable instructions executed by a computer system and encoded or stored on a computer readable medium. Further, the method 1000 can be performed by gates or circuits associated with a processor, an ASIC, a FPGA, a SOC, or other hardware device. Hereinafter, the method 1000 shall be explained with reference to the systems, components, devices, modules, software, data structures, heat maps, The AP 120 can send to the location server 105 connected to the network 110, a location determination (coordinates) and a RSSI measurement, as signal 604, in stage 1008. This result may be associated with a past search. These past search results or past location determinations may be saved by the AP 120 and associated with the AP 120 that provided the information.

A determined RSSI threshold 810 may then be received, in stage 1012, as signal 612. The AP 120 may then receive a new signal from a user device 155, in stage 1016. In some configurations, the AP 120 may use the RSSI threshold 810 to determine if the device 155 is on the same floor with the AP 120. Thus, the AP 120 compares the RSSI of the new signal, received in stage 1016, with the RSSI threshold received in stage 1016. The AP 120 determines if the RSSI of the new signal is above the RSSI threshold 810, in stage 1020.

When the RSSI of the new signal is below the RSSI threshold, the process proceeds "NO" to stage 1028. In stage 1028, the AP 120 can send new location information and, in stage 1032, can send new raw RSSI measurement information to the location server 105. Thus, the location server 105 may receive a new location determination and may also receive a new RSSI measurement to adjust the RSSI threshold 810, if necessary. If the RSSI of the new signal is above the RSSI threshold, the process proceeds "YES" to stage 1024, where the AP 120 send location information to the location server 105, as described hereinafter.

Figure 10B:
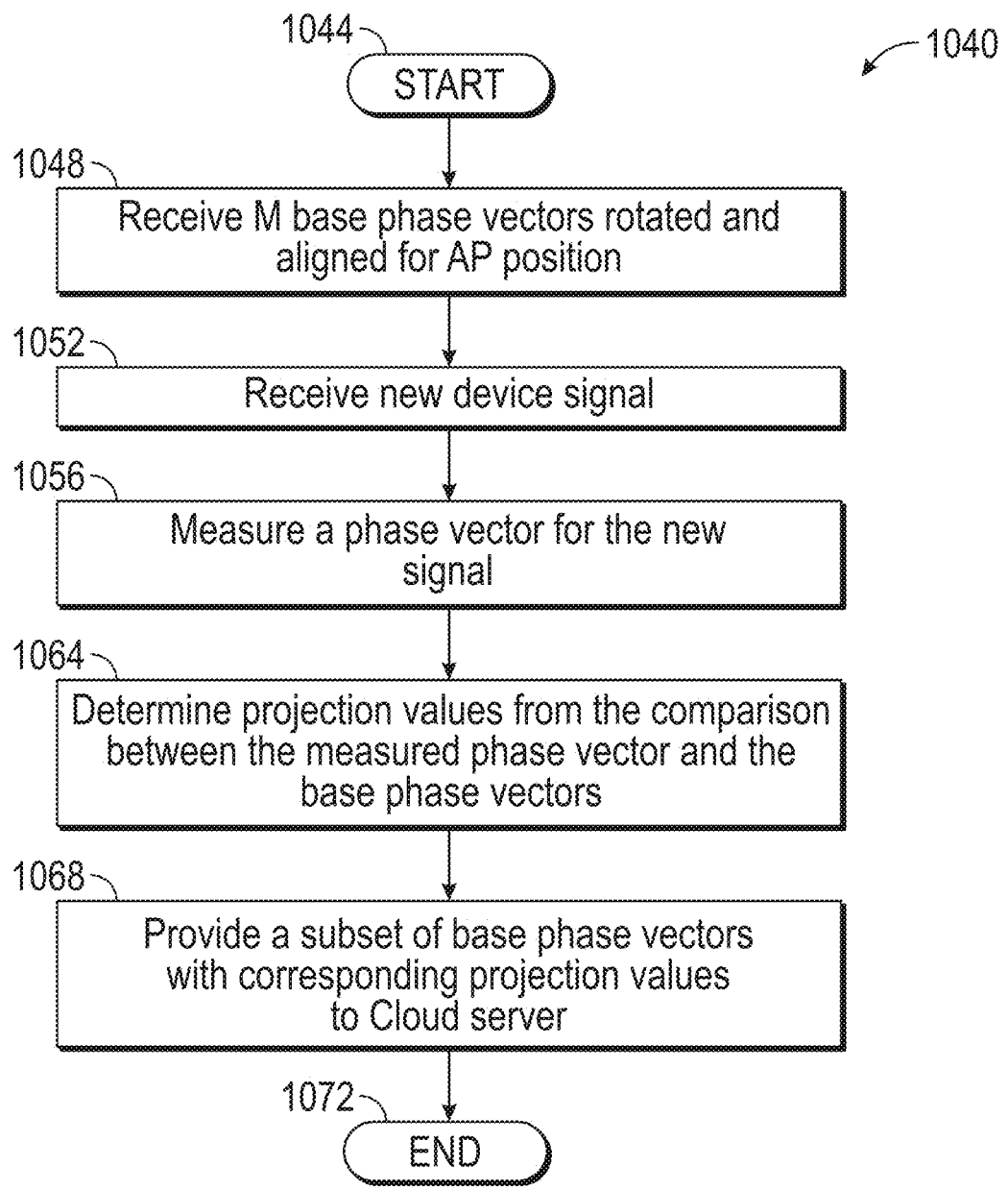
FIG. 10B is a method, conducted by an AP, for determining a location of a user device in accordance with aspects of the present disclosure.

An embodiment of a method 1040, as conducted by an AP 120, for determining a location of a user device 155 may be as shown in FIG. 10B. A general order for the stages of the method 1040 is shown in FIG. 10B. Generally, the method 1040 starts with a start operation 1044 and ends with an end operation 1072. The method 1040 can include more or fewer stages or can arrange the order of the stages differently than those shown in FIG. 10B. The method 1040 can be executed as a set of computer-executable instructions executed by a computer system and encoded or stored on a computer readable medium. Further, the method 1040 can be performed by gates or circuits associated with a processor, an ASIC, a FPGA, a SOC, or other hardware device. Hereinafter, the method 1040 shall be explained with reference to the systems, components, devices, modules, software, data structures, heat maps, methods, etc. described in conjunction with FIGS. 1-10A and 11.

The AP 120 can send to the location server 105, a location determination result as signal 704. This result may be associated with a past search. These past search results or past location determinations may be saved by the location server 105 and associated with the AP 120 that provided the information. In at least some configurations, after some number of results are received, the location server 105 can determine a set of base phase vectors 400 for the AP 120. This set 400 of M number of base phase vectors 402 may be received by the AP 120, in stage 1048. The base phase vectors 402 may be rotated and aligned for the AP 120 and the position of the AP.

Thereinafter, the AP 120 can receive a new signal from a device 155 in location 200, in stage 1052. The AP 120 can then measure the phase vector for the new signal, in stage 1056. This measured phase vector may then be projected onto each of the base phase vectors as a comparison between the measured phase vector and each of the base phase vectors. From this comparison, the AP 120 can derive a projection for each base phase vector 402, in step 1064. Higher the projection values indicate more correlation between the measured phase vector and the base phase vector. These projection values can become weights for the clouds server later.

Based on the projection values, the AP 120 can extract a subset of the base phase vectors 824. The subset of base phase vectors 824 can be fewer base phase vectors 420 than are in the original set 820. The location server 105 can indicate to the AP 120 through a setting how many base phase vectors are to be in the subset 824. This subset of base phase vectors 824 and the associated projection values (or weights) is then composed into data structure 830 for signal 720, which is sent to the location server 105, in stage 1068.

Figure 11:
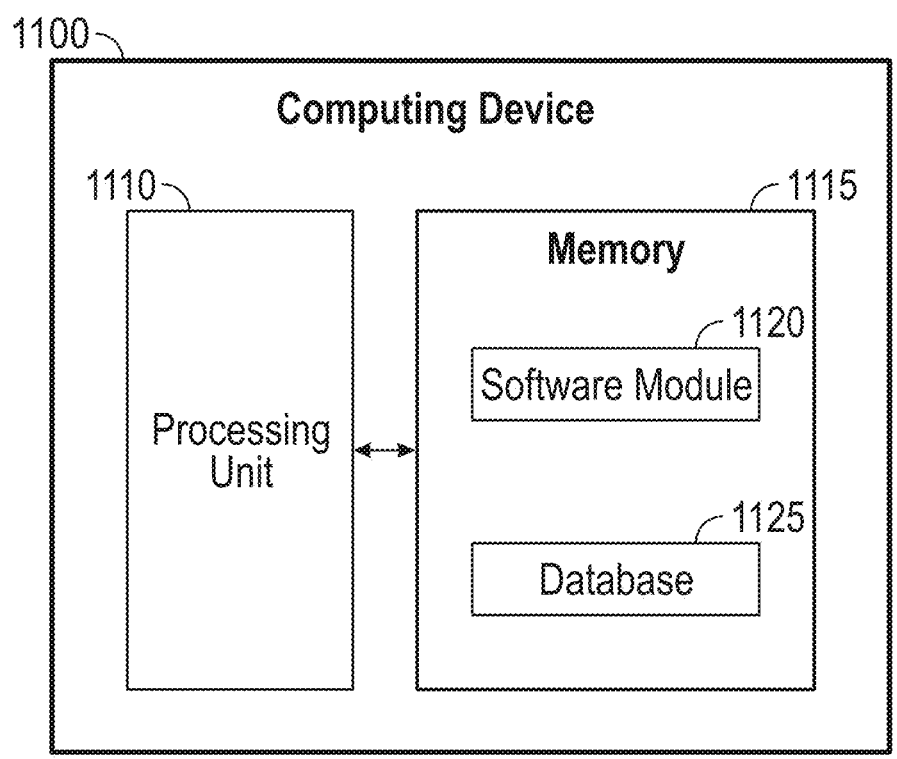
FIG. 11 shows a block diagram of a computer or computing device for conducting or executing the methods and processes for determining a location of a user device in accordance with aspects of the present disclosure.

FIG. 11 shows computing device 1100. As shown in FIG. 11, computing device 1100 may include a processing unit 1110 and a memory unit 1115. Memory unit 1115 may include a software module 1120 and a database 1125. While executing on processing unit 1110, software module 1120 may perform, for example, processes for determining a RSSI or base phase vector of a device signal, sending that location information to a location server, or determining a coordinate location of that device based on at least the received location information, including for example, any one or more of the stages from method 800 or method 900 described above with respect to FIG. 8 and FIG. 9. Computing device 1100, for example, may provide an operating environment for elements of operating environment 100 including, but not limited to, Location server 105, router 115, AP 120, and user device 155. Elements of operating environment 100 (e.g., Location server 105, router 115, AP 120, and user device 155) may operate in other environments and are not limited to computing device 1100.

Computing device 1100 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 1100 may comprise any computer operating environment, such as hand-held devices, multi-processor systems, microprocessor-based or programmable sender electronic devices, minicomputers, mainframe computers, and the like. Computing device 1100 may also be practiced in distributed computing environments where tasks are performed by remote processing devices. The aforementioned systems and devices are examples and computing device 1100 may comprise other systems or devices.

Accordingly, aspects of the present disclosure comprise a method comprising: receiving a set of two or more base phase vectors; measuring, by an Access Point (AP) in a network, a measured phase vector for a first signal from a user device; determining projection values based on a comparison of the measured phase vector to each base phase vector; determining subset of base phase vectors with the highest projection values; and sending the projection values and the subset of base phase vectors to the location server, wherein the location server determines the device location from the projection values and the subset of base phase vectors.

Any of the one or more above aspects, wherein the subset of base phase vectors is one base phase vector.

Any of the one or more above aspects, wherein each base phase vector is associated with a heat map.

Any of the one or more above aspects, wherein, if there are more than one base phase vector in the subset, combining the heat maps associated with each base phase vector.

Any of the one or more above aspects, wherein the projection values for the subset of base phase vectors determine a weight of the heat map.

Any of the one or more above aspects, wherein the two or more base phase vectors are each at a different angle.

Any of the one or more above aspects, wherein the two or more base phase vectors are orthogonal to each other.

Any of the one or more above aspects, further comprising: receiving an RSSI threshold from the location server; determining a RSSI value for the first signal from the user device;

comparing the determined RSSI value to the RSSI threshold; and if the determined RSSI value is above the RSSI threshold, providing location information about the user device to the location server.

Any of the one or more above aspects, wherein if the determined RSSI value is not above the RSSI threshold, the AP: providing the location information and the determined RSSI value about the signal from the user device to the location server; or not providing location information to the location server.

Any of the one or more above aspects, wherein if the determined RSSI value is above the RSSI threshold, the user device is on a same floor as the AP.

Aspects of the present disclosure further comprise a method comprising: receiving, by a location server, two or more signals, having location information and RSSI information from two or more Access Points (APs) associated with a location of a user device, based on the RSSI information, generating an RSSI threshold for each AP; sending the RSSI threshold to each AP; receiving a projection value and a base phase vector from each AP; based on the projection values and the base phase vectors, generating a combined heat map that indicates the location of the user device.

Any of the one or more above aspects, wherein each base phase vector has an associated heat map.

Any of the one or more above aspects, wherein generating a combined heat map comprises combining the associated heat maps from each base phase vector from each AP into the combined heat map.

Any of the one or more above aspects, further comprising receiving the projection value and the base phase vector with new RSSI information.

Any of the one or more above aspects, wherein the new RSSI information indicates that the user device is not on the same floor as the AP, the method further comprising: adjusting the RSSI threshold based on the new RSSI information Aspects of the present disclosure further comprise a system comprising: a network; a first Access Point (AP) in communication over the network, the first AP comprising: a memory storage; a processing unit coupled to the memory storage, wherein the processing unit is operative to: receive an RSSI threshold from a location server; receive a set of two or more base phase vectors; receive a first signal from a user device; based on receiving the first signal, determine an RSSI value for the first signal from the user device; compare the determined RSSI value to the RSSI threshold; if the determined RSSI value is above the RSSI threshold: measure a measured phase vector for the first signal; determine projection values based on a comparison of the measured phase vector to each base phase vector; determine subset of base phase vectors with the highest projection values; and send the projection values and the subset of base phase vectors to the location server in a second signal; the location server in communication with the AP over the network, the location server comprising: a second memory storage; and a second processing unit coupled to the second memory storage, wherein the second processing unit is operative to: receive location information and RSSI information from the first AP associated with a location of the user device, based on the RSSI information, generate the RSSI threshold; send the RSSI threshold to the first AP; receive a set of projection values and base phase vectors from the first AP; and based on the projection values and the base phase vectors, generate a combined heat map that indicates the location of the user device.

Any of the one or more above aspects, wherein each base phase vector has an associated heat map, and wherein generating a combined heat map comprises combining the associated heat maps from each base phase vector into the combined heat map.

Any of the one or more above aspects, wherein the second processing unit is further operative to receive the projection value and the base phase vector with new RSSI information, wherein the new RSSI information indicates that the user device is not on the same floor as the first AP; and adjust the RSSI threshold based on the new RSSI information.

Any of the one or more above aspects, wherein the two or more base phase vectors are each at a different angle, and wherein the two or more base phase vectors are orthogonal to each other.

Any of the one or more above aspects, wherein the projection values for the subset of base phase vectors determines a weight of the combined heat map.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a read-only memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' steps or stages may be modified in any manner, including by reordering steps or stages and/or inserting or deleting steps or stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a set of two or more base phase vectors;
measuring, by an Access Point (AP) in a network, a measured phase vector for a first signal from a user device;
determining projection values based on a comparison of the measured phase vector to each base phase vector;
determining subset of base phase vectors with the highest projection values; and
sending the projection values and the subset of base phase vectors to a location server, wherein the location server determines a location of the user device from the projection values and the subset of base phase vectors.

2. The method of claim 1, wherein the subset of base phase vectors is one base phase vector.

3. The method of claim 1, wherein each base phase vector is associated with a heat map.

4. The method of claim 3, wherein, if there are more than one base phase vector in the subset, combining the heat maps associated with each base phase vector.

5. The method of claim 4, wherein the projection values for the subset of base phase vectors determine a weight of the heat map.

6. The method of claim 5, wherein the two or more base phase vectors are each at a different angle.

7. The method of claim 6, wherein the two or more base phase vectors are orthogonal to each other.

8. The method of claim 1, further comprising:
receiving an Received Signal Strength Indicator (RSSI) threshold from the location server;
determining a RSSI value for the first signal from the user device;
comparing the determined RSSI value to the RSSI threshold; and
if the determined RSSI value is above the RSSI threshold, providing location information about the user device to the location server.

9. The method of claim 8, wherein if the determined RSSI value is not above the RSSI threshold, the AP:
providing the location information and the determined RSSI value about the signal from the user device to the location server; or
not providing location information to the location server.

10. The method of claim 9, wherein if the determined RSSI value is above the RSSI threshold, the user device is on a same floor as the AP.

11. A system comprising:
a network;
a first Access Point (AP) in communication over the network, the first AP comprising:
a first memory storage;
a first processing unit coupled to the first memory storage, wherein the processing unit is operative to:
receive an Received Signal Strength Indicator (RSSI) RSSI threshold from a location server;
receive a set of two or more base phase vectors;
receive data corresponding to a first signal from a user device;
based on receiving the data corresponding to the first signal, determine an RSSI value for the first signal;
compare the determined RSSI value to the RSSI threshold;
if the determined RSSI value is above the RSSI threshold:
measure a measured phase vector for the first signal;
determine projection values based on a comparison of the measured phase vector to each base phase vector;
determine subset of base phase vectors with the highest projection values; and
send the projection values and the subset of base phase vectors to the location server in a second signal.

12. The system of claim 11, wherein the two or more base phase vectors are each at a different angle, and wherein the two or more base phase vectors are orthogonal to each other.

13. A system comprising:
a network;
a first Access Point (AP) in communication over the network, the first AP comprising:
a first memory storage;
a first processing unit coupled to the first memory storage, wherein the processing unit is operative to:
receive an RSSI threshold from a location server;
receive a set of two or more base phase vectors;

receive data corresponding to a first signal from a user device;
based on receiving the data corresponding to the first signal, determine an Received Signal Strength Indicator (RSSI) value for the first signal;
compare the determined RSSI value to the RSSI threshold;
if the determined RSSI value is above the RSSI threshold:
- measure a measured phase vector for the first signal;
- determine projection values based on a comparison of the measured phase vector to each base phase vector;
- determine subset of base phase vectors with the highest projection values;
- send the projection values and the subset of base phase vectors to the location server in a second signal;

the location server in communication with the AP over the network, the location server comprising:
a second memory storage;
a second processing unit coupled to the second memory storage, wherein the second processing unit is operative to:
- receive location information and RSSI information from the first AP associated with a location of the user device;
- based on the RSSI information, generate the RSSI threshold;
- send the RSSI threshold to the first AP;
- receive a set of projection values and base phase vectors from the first AP; and
- based on the projection values and the base phase vectors, generate a combined heat map that indicates the location of the user device.

* * * * *